(12) United States Patent
Takaoka

(10) Patent No.: US 7,006,259 B1
(45) Date of Patent: Feb. 28, 2006

(54) FACSIMILE APPARATUS AND METHOD OF CONTROLLING THE APPARATUS

(75) Inventor: Tatsuo Takaoka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/538,417

(22) Filed: Mar. 29, 2000

(30) Foreign Application Priority Data

| Apr. 2, 1999 | (JP) | ................................. 11-096093 |
| Jun. 25, 1999 | (JP) | ................................. 11-179329 |

(51) Int. Cl.
  *H04N 1/00* (2006.01)
  *H04N 1/41* (2006.01)
  *H04M 11/00* (2006.01)

(52) U.S. Cl. ............. 358/405; 358/426.08; 379/100.05

(58) Field of Classification Search ................ 358/400, 358/401, 405, 403, 426.12, 426.16, 442, 358/1.15, 1.16, 407, 426.08; 379/100.01, 379/100.05, 100.09
See application file for complete search history.

(56) References Cited

U.S. PATENT DOCUMENTS

| RE34,429 E | * | 11/1993 | Baran ......................... 379/100 |
| 6,631,431 B1 | * | 10/2003 | Silvkoff ...................... 710/100 |

FOREIGN PATENT DOCUMENTS

| JP | 2000175056 | * | 6/2000 |
| JP | 02000175057 | * | 6/2000 |
| JP | 2000216930 | * | 8/2000 |
| JP | 2001103198 | * | 4/2001 |
| JP | 2001238059 | * | 8/2001 |

OTHER PUBLICATIONS

Toshiba Facsimile; Tridom. Mindana; pp. 1 and 2; ww2.mozcom.com/~tricomv/dp85f_specs.htm.*

* cited by examiner

*Primary Examiner*—Jerome Grant, II
(74) *Attorney, Agent, or Firm*—Cooper & Dunham LLP

(57) ABSTRACT

A facsimile apparatus is provided with boxes corresponding to an F-code which is received by facsimile transmission procedures, executes a center-machine application using the corresponding boxes based on sub-address information when receiving image information, the apparatus comprising. In the apparatus, an F-code input requesting portion requests a user to input an F-code when the user operates the apparatus for performing transmission, and a control portion searches for the box for which an F-code is registered, the value of which F-code agrees with the value of the F-code input by the user, and, only when finding the box, agrees to accept the transmission operation performed by the user, and registers, in document managing information for managing the transmission job performed by the transmission operation, identification information for the box as authentication information.

50 Claims, 17 Drawing Sheets

FIG. 3

| DOCUMENT NUMBER |
| --- |
| PRODUCTION DATE/TIME |
| PERFORMANCE DATE/TIME |
| DOCUMENT TYPE |
| IDENTIFICATION INFORMATION |
| IMAGE INFORMATION |
| BOX NUMBER |
| PERFORMANCE RESULT |

FIG. 4

○ YOU CAN FAX      SET ORIGINAL AND SPECIFY DESTINATION
MEMORY TRANSMISSION                              100%

[EXTENSION TRANSMISSION]   [COMMUNICATION INFORMATION]

FIG. 5

MEMORY TRANSMISSION    SET ORIGINAL AND SPECIFY DESTINATION
MEMORY TRANSMISSION                              100%

[EXTENSION TRANSMISSION]   [COMMUNICATION INFORMATION]

FIG. 6

PUSH START BUTTON

046212345678

| DESTINATION ADDITION | EXTENSION TRANSMISSION | COMMUNICATION INFORMATION |

FIG. 7

● EXTENSION TRANSMISSION     SPECIFY FUNCTION TO BE USED
                             BY INPUTTING NUMBER

01  TIME SPECIFICATION        02  CONFIDENTIAL TRANSMISSION

03  DELIVERY DATE SPECIFICATION   04  SENDER'S INFORMATION

| PRECEDING PAGE | FOLLOWING PAGE | END |

FIG. 8

● SENDER'S INFORMATION     SPECIFY CODE NUMBER

| CANCEL | SET |

FIG. 9

● SENDER'S INFORMATION     SPECIFY CODE NUMBER

12345

| CANCEL | SET |

FIG. 10
● SENDER'S INFORMATION   SPECIFY CODE NUMBER
DO YOU USE  ABC TARO ?
YES   NO
FIG. 11
● SENDER'S INFORMATION   SPECIFY CODE NUMBER
*****
CANCEL   SET
FIG. 12
FIG. 13

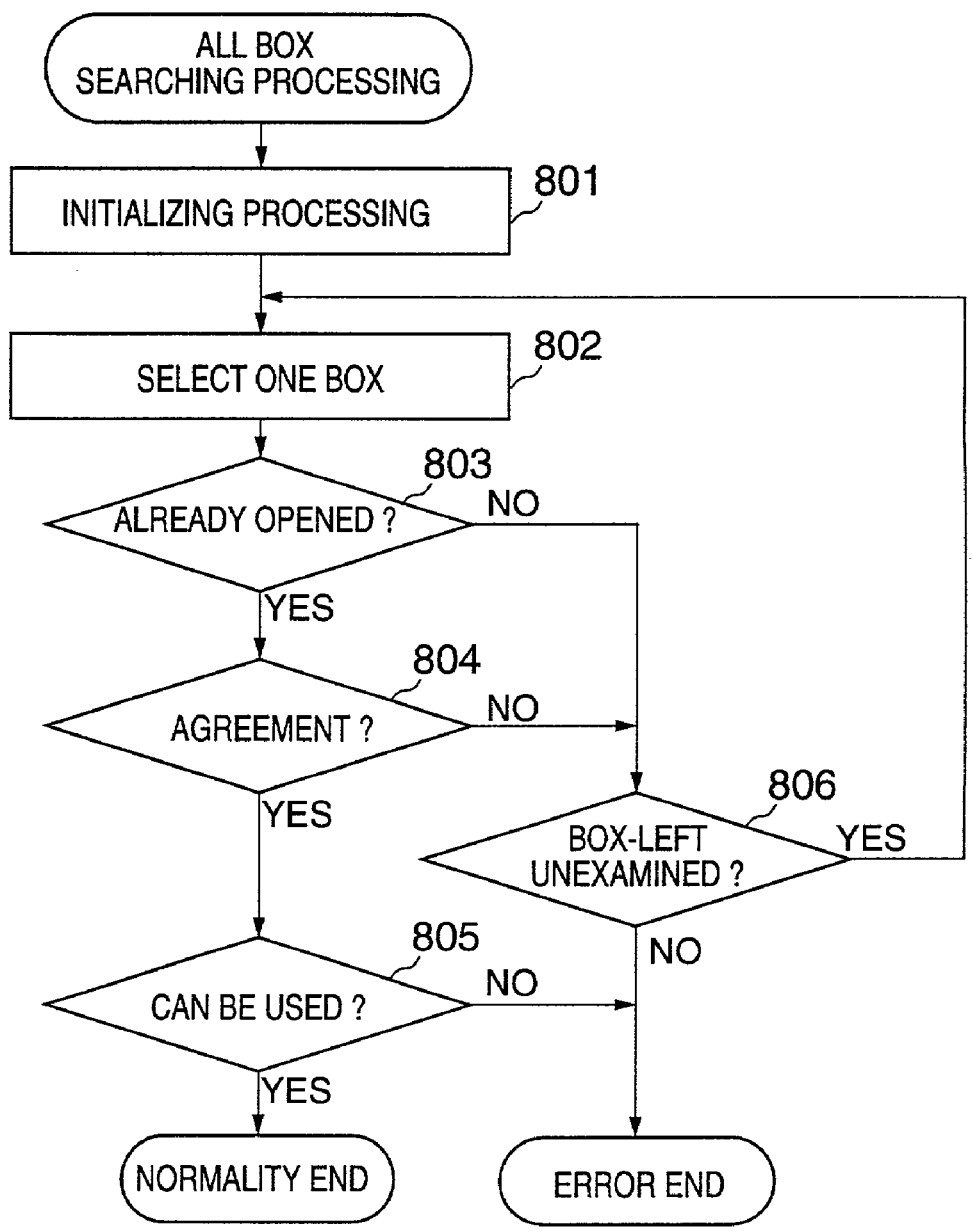

FACSIMILE APPARATUS AND METHOD OF CONTROLLING THE APPARATUS

BACKGROUND OF THE INVENTION

1. Field of the Invention

The present invention generally relates to a facsimile apparatus provided with boxes each corresponding to an F-code received through a facsimile transmission procedure, and executing a center-machine application using a corresponding box based on sub-address information and so forth received when image information is received, and a method of controlling such a facsimile apparatus.

2. Description of the Related Art

In the related art, post-office boxes (confidential boxes) for confidential communication are produced using the image storing function of a facsimile apparatus, and, thereby, confidential communication can be performed. An apparatus in which such a function can be achieved is mainly used as a center apparatus for facsimile communication services.

For each confidential box, a box name, a password, and a code number (F-code) for identification are registered. When a transmission side wishes confidential communication, the transmission side transmits a signal SUB for specifying confidential communication, and, also, specifies, in a FIF portion of the signal SUB, the F-code registered for the confidential box which is the destination of the confidential communication, in a pre-transmission procedure. With regard to the format of F-codes, the method of utilizing F-codes and so forth, detailed description will be omitted because that information is prescribed in standards promulgated by the Communications Industry Association of Japan.

Thereby, a center apparatus stores received image information in the confidential box for which the F-code specified by the signal SUB is registered. Then, the user of the destination of the confidential communication makes specification such as to receive a confidential document to the center apparatus, specifies the confidential box from which the confidential document is to be received by inputting an F-code, and inputs a password. Thereby, the confidential document is printed out from the center apparatus.

Further, polling reception by specifying a confidential box can be performed. In this case, a facsimile apparatus which requests polling reception transmits a signal SEP for specifying selective polling reception in a pre-transmission procedure, and, also, sets an F-code to the FIF portion of the signal SEP for specifying a confidential box from which the facsimile apparatus requests the polling reception. Further, the facsimile apparatus transmits a signal PWD to the center apparatus, which signal carries a password for authentication.

(Through the specification and claims of the present application, the term 'polling' means the following act:

in a condition in which pieces of information are previously prepared in a server, when a client requests the server to provide one or more of the pieces of information, the server provides the piece(s) of information to the client, for example.)

Thereby, the center apparatus performs authentication using the contents of the received signal PWD for the confidential box for which the specified F-code is registered, and, when the authentication succeeds, transmits the image information stored in the confidential box to the facsimile apparatus which requests the polling reception.

Storage of image information in the confidential box may be performed by using a scanner provided with the center apparatus.

A center apparatus such as that described above has a plurality of types of authentication information and so forth for various management operations such as operation for user restriction and so forth, in addition to a communication application using F-codes. Therefore, an enormous memory resource is required. As a result, the cost of the apparatus is very high.

SUMMARY OF THE INVENTION

The present invention has been devised in consideration of these circumstances, and, an object of the present invention is to provide a facsimile apparatus, the cost of which can be reduced, and a method of controlling such a facsimile apparatus.

A facsimile apparatus according to the present invention, provided with boxes each corresponding to an F-code which is received through a facsimile transmission procedure, executing a center-machine application using the corresponding box based on sub-address information when receiving image information, the apparatus comprising:

an F-code input requesting portion which requests a user to input an F-code when the user operates the apparatus for performing transmission; and a control portion which searches for the box for which the F-code is registered, the value of which F-code agrees with the value of the F-code input by the user, and, only when finding the box, agrees to accept the transmission operation performed by the user, and registers, in document managing information for managing a transmission job relating to the transmission operation, identification information for the box as authentication information.

The facsimile apparatus may further comprise a transmission control portion which, when image information is transmitted, reads an F-code or a box name registered for the box corresponding to the authentication information registered in the document managing information, and inserts information indicating the F-code in at least any one page of the image information.

A facsimile apparatus according to another aspect of the present invention, provided with boxes each corresponding to an F-code which is received through a facsimile transmission procedure, executing a center-machine application using the corresponding box based on sub-address information when receiving image information, the apparatus comprising:

an F-code input requesting portion which requests a user to input an F-code when the user operates the apparatus for producing a polling document; and a control portion which searches for the box for which the F-code is registered, the value of which F-code agrees with the value of the F-code input by the user, and, only when finding the box, agrees to accept the polling document producing operation performed by the user, and registers, in document managing information for managing a job relating to the polling document producing operation, identification information for the box as authentication information.

The facsimile apparatus may further comprise a transmission control portion which, when a call is coming and polling reception is requested by the call originating terminal, reads the F-code or box name registered for the box corresponding to the authentication information registered in the document managing information corresponding to the specified document to be transmitted, and inserts information indicating the F-code or box name in at least any one page of the image information to be transmitted.

A facsimile apparatus according to another aspect of the present invention, provided with boxes each corresponding to an F-code which is received through a facsimile transmission procedure, executing a center-machine application using the corresponding box based on sub-address information when receiving image information, the apparatus comprising:

an F-code input requesting portion which requests a user to input an F-code either when the user operates the apparatus for performing transmission or when the user operates the apparatus for producing a polling document;

a control portion which searches for the box for which the F-code is registered, the value of which F-code agrees with the value of the F-code input by the user, and, only when finding the box, either agrees to accept the transmission operation performed by the user, and registers, in document managing information for managing a transmission job relating to the transmission operation, identification information for the box as authentication information, or agrees to accept the polling document producing operation performed by the user, and registers, in document managing information for managing a job relating to the polling document producing operation, identification information for the box as authentication information.

The facsimile apparatus may further comprise a transmission control portion which, when image information is transmitted, reads the F-code or box name registered for the box corresponding to the authentication information registered in the document managing information, and inserts information indicating the F-code or box name in at least any one page of the image information, but, when a call is coming and polling reception is requested by the call originating terminal, reads the F-code registered for the box corresponding to the authentication information registered in the document managing information corresponding to the specified document to be transmitted, and inserts information indicating the F-code or box name in at least any one page of the image information to be transmitted.

Thereby, the box information mainly relating to reception operation is used for user authentication performed when user restriction or the like in transmission operation is performed. Accordingly, it is not necessary to further provide information for the user authentication. As a result, it is possible to reduce the necessary memory capacity of a system memory or the like, and to reduce the cost of the apparatus.

Further, information (F-code or box name) which is obtained by referring to the box number is used as transmission side information to be inserted in to an image when the image information is transmitted. As a result, it is not necessary to use special information as information to specify the transmission side information, and it is possible to limit the size of the document managing information to a small one. Thereby, it is possible to reduce the necessary memory capacity of the system memory or the like, and to reduce the cost of the apparatus.

Further, information (F-code or box name) which is obtained by referring to the box number is used as transmission side information to be inserted into an image when polling transmission is performed. As a result, it is not necessary to use special information as information to specify the transmission side information, and it is possible to limit the size of the document managing information to a small one. Thereby, it is possible to reduce the necessary memory capacity of the system memory or the like, and to reduce the cost of the apparatus.

Further, because user authentication and specification of the box can be performed by using a single F-code in common, it is very easy for the user to use the apparatus and the apparatus is very convenient for the user in comparison to a case where a plurality of pieces of information for authentication are used.

Other objects and further features of the present invention will become more apparent from the following detailed description when read in conjunction with the accompanying drawings.

BRIEF DESCRIPTION OF THE DRAWINGS

FIG. 3 illustrates one example of a set of document managing information;

FIGS. 4 through 11 illustrate examples of displayed pictures;

FIGS. 12 and 13 illustrate examples of images to be transmitted;

FIG. 28 is a flow chart showing another example of the all box searching processing.

DETAILED DESCRIPTION OF THE PREFERRED EMBODIMENTS

Figure 1:
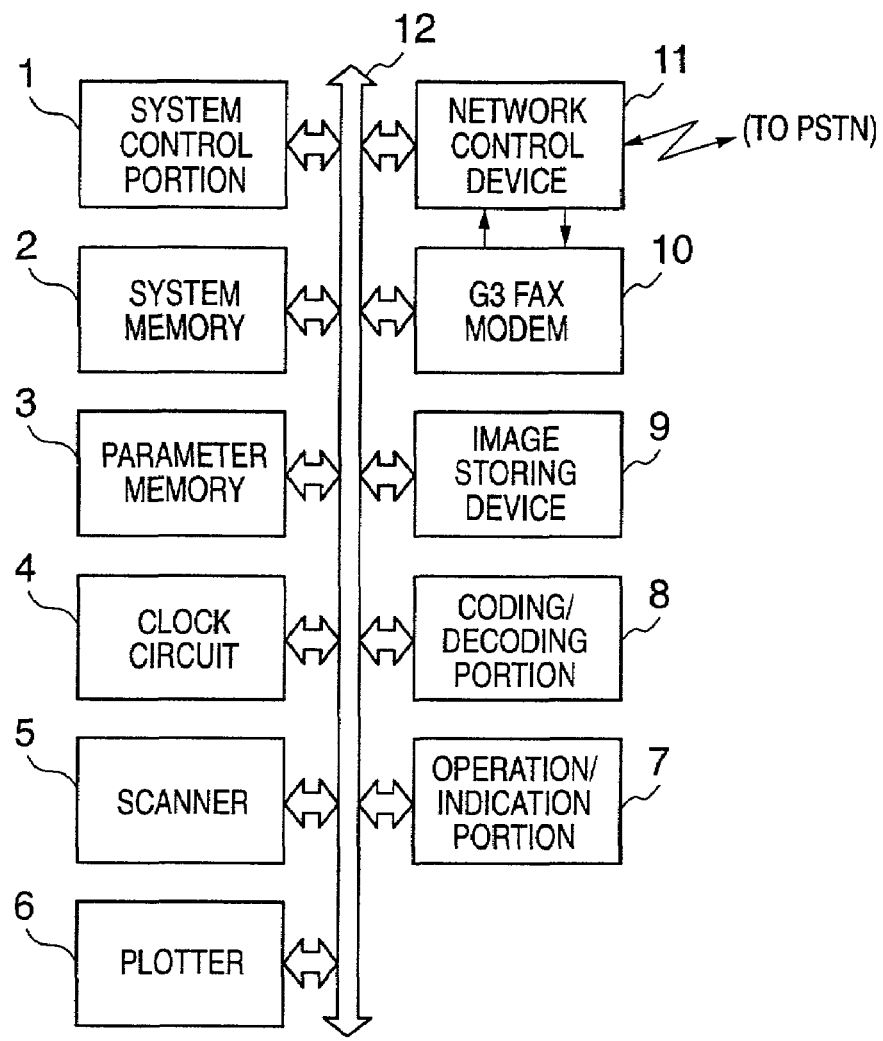
FIG. 1 is a block diagram showing an example of an arrangement of a Group 3 facsimile apparatus in one embodiment of the present invention.

FIG. 1 shows an example of an arrangement of a Group 3 facsimile apparatus in one embodiment of the present invention.

In the figure, a system control portion 1 performs control processing for each portion of the Group 3 facsimile apparatus, and various control processing such as processing for a facsimile transmission control procedure, and so forth. A system memory 2 stores therein control processing programs executed by the system control portion 1, various data needed for executing the processing programs, and so forth, and, also, acts as a work area for the system control portion 1. A parameter memory 3 stores therein various information particular to this Group 3 facsimile apparatus (for example, registered information for a one-touch dialing function and so forth). A clock circuit 4 outputs information of the current time.

A scanner 5 reads an original image in a predetermined resolution. A plotter 6 prints out an image in a predetermined resolution. An operation/indication portion 7 is used for a user to operate this Group 3 facsimile apparatus, and includes various keys, and various indicators.

A coding/decoding portion 8 codes and compresses an image signal, and decodes coded and compressed image information into an original image signal. An image storing device 9 stores therein many pages of coded and compressed image information, and achieves the above-described confidential-box functions.

A Group 3 facsimile modem 10 achieves Group 3 facsimile modem functions, and, has low-rate modem functions (V. 21 modem) for transmitting/receiving transmission procedure signals, and high-rate modem functions (V. 17 modem, V. 34 modem, V. 29 modem, V. 27ter modem and so forth) for mainly transmitting/receiving image information.

A network control device 11 is used for connecting this Group 3 facsimile apparatus to a public network (PSTN) and has automatic calling/call receiving functions.

These system control portion 1, system memory 2, parameter memory 3, clock circuit 4, scanner 5, plotter 6, operation/indication portion 7, coding/decoding portion 8, image storing device 9, Group 3 facsimile modem 10 and network control device 11 are connected to an internal bus 12, and the internal bus 12 is mainly used for transmitting/receiving data between the respective portions.

However, data transmission is performed directly between the network control device 11 and Group 3 facsimile modem 10.

Figure 2:
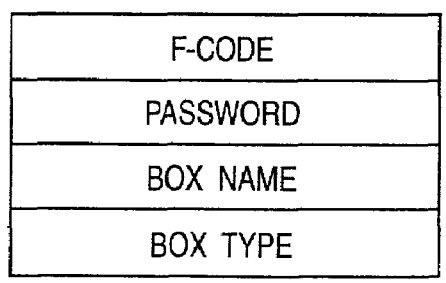
FIG. 2 illustrates one example of a set of box information.

This Group 3 facsimile apparatus is provided with a plurality of boxes using the image storing device 9. For each box, box information such as that shown in FIG. 2 is produced for managing the respective boxes, and is stored in the system memory 2. Actual image information is stored in the image storing device 9, and, information specifying which box the image information belongs to is added to storage managing information (not shown in the figures) which is provided for managing thus stored image information. Thereby, storage of the image information in the respective boxes, and so forth are managed.

One set of box information consists of registered F-code entry, password entry, box name entry, box-type information entry expressing a type of a box ('confidential box', 'bulletin board', 'relay box' or the like), and one or more distribution-destination information entries.

A predetermined number of boxes are previously prepared, and, by user's operation, whether or not the box is used is registered. Such a user's operation for using a box is referred to as a 'box opening operation', hereinafter. (To perform such an operation for using a box is referred to as 'to open the box', hereinafter.)

The contents of the respective entries of one set of the box information are registered when it is needed. Accordingly, there may be a confidential box for which no password is registered, for example.

In this Group 3 facsimile apparatus, document managing information for managing transmission/reception jobs is produced, and is stored in the system memory 2. FIG. 3 shows an example of this document managing information.

One set of document managing information consists of a document number entry for identifying each document, a production date/time entry indicating the date/time at which the document was produced, a performance date/time entry indicating the date/time at which communication was performed, a document type entry indicating the type of the document ('to-be-transmitted document', 'received document', 'polling document' or the like), an identification information entry indicating information for identifying a box (for example, a box number) which was used for authentication of the user who produced the document, or the like, an image information entry indicating reference information for the image information (document information) in the image storing device 9 corresponding to this set of document managing information, a box number entry indicating a box in which the document information corresponding to this set of document managing information is stored, and a performance result entry indicating the result of performance of communication.

Depending on the attribute of the document corresponding to a set of document managing information, effective information may not be registered as each entry of the set of document managing information. For example, the box number entry is not used for a to-be-transmitted document.

When facsimile transmission is performed using this Group 3 facsimile apparatus, a picture such as that shown in FIG. 4 is displayed, as an initial picture, on a display screen of the operation/indication portion 7.

When a to-be-transmitted original is set in this state, the contents of the displayed picture changes into that shown in FIG. 5, and, when a destination is input in accordance with the displayed guidance, the contents of the input destination is displayed, and, also, the guidance for subsequent operation is displayed, as shown in FIG. 6.

Then, because it is necessary to input sender's information for user authentication, 'extension transmission' displayed as shown in FIG. 6 is selected. Thereby, the displayed picture changes into that shown in FIG. 7. From this picture, '04 sender's information' is selected. Thereby, the displayed picture changes into that shown in FIG. 8, and a code number is requested to be input.

Then, a user inputs an F-code as the code number. In response to this inputting operation by the user, the thus-input contents are displayed as shown in FIG. 9. For example, the F-code is the F-code which was registered for a box which the user opened for himself/herself.

When an F-code is input as mentioned above, the Group 3 facsimile apparatus searches for the set of box information in which the same value as the thus-input F-code is registered as the F-code entry thereof. Then, when the thus-searched-for set of box information is found and the search is succeeded, the box name is read from the thus-obtained set of box information, the guidance shown in FIG. 10 is displayed, and the user is requested to confirm it.

Then, when the user selects 'YES', the box number of this box is used as the identification information for the transmission operation, and, also, the user authentication is succeeded, and the subsequent transmission operation can be performed.

When a code number is input, another person may stole a glance at and abuse the code number when the input contents are displayed as shown in FIG. 9. In order to prevent such a situation, it is preferable that the input contents are concealed as a result of a string having the number of characters (in this case, a string of '*'), which number is the same as that of the input code number, being instead displayed as shown in FIG. 11.

Further, when image information is transmitted as a result of the above-mentioned transmission operation being performed, the contents of an F-code set by the user at this time is displayed in the 'sending code' section as shown in FIG. 12 (as a display image of the F-code) or the box number of the box set by the user at this time is displayed in the 'sender section' as shown in FIG. 13 (as a display image of the box number). The type of this displayed information depends on the set contents of the Group 3 facsimile apparatus.

This method of performing authentication of a user using the box information can also be used not only when transmission operation is performed but also when a document for polling transmission is produced.

Thus, in this embodiment, the box information mainly relating to reception operation is used and user authentication is performed for user restriction or the like in transmission operation. Accordingly, it is not necessary to further provide information for the user authentication. As a result, it is possible to reduce the necessary memory capacity of the system memory 2, and to reduce the cost of the apparatus.

Figure 14:
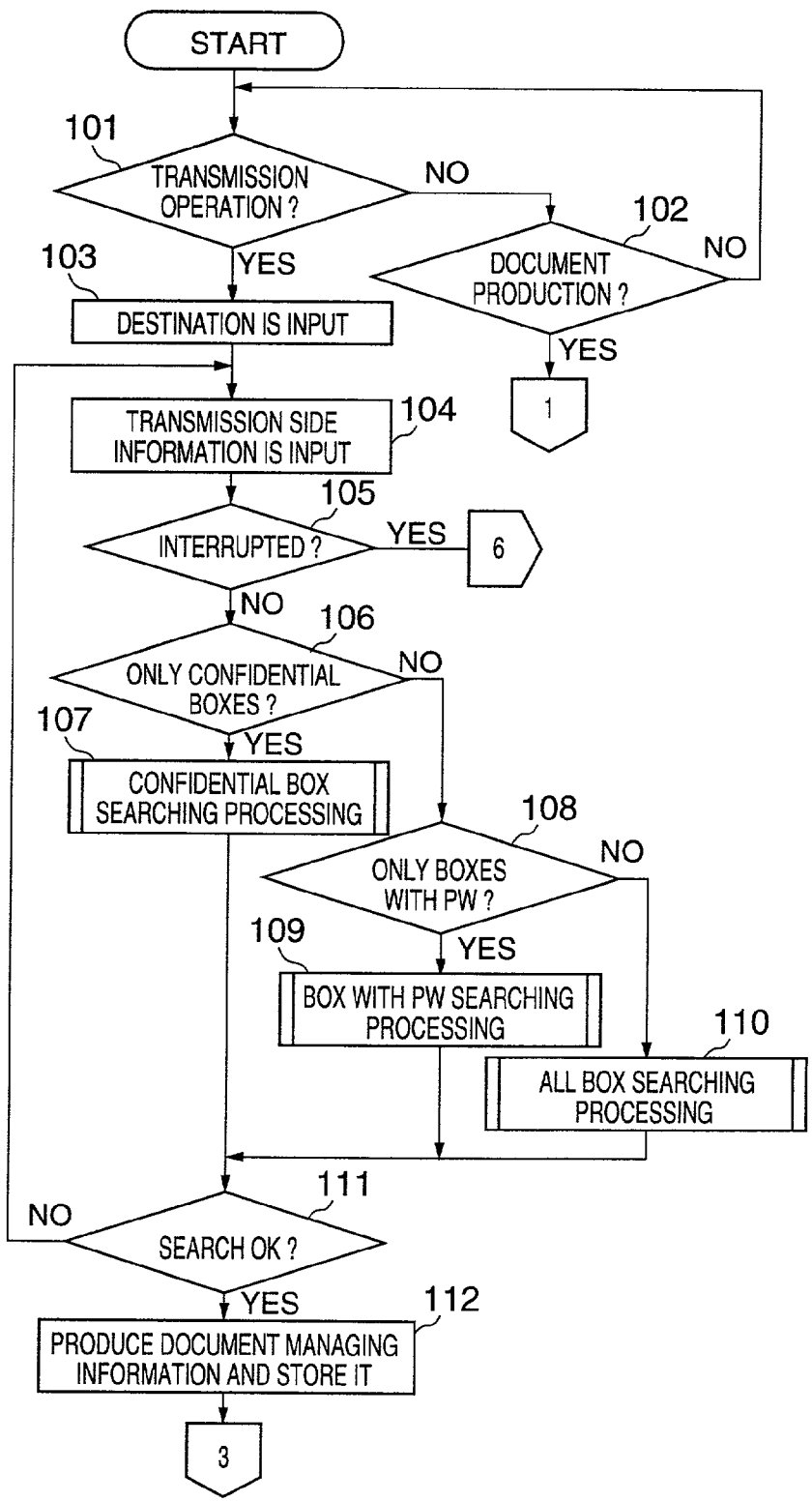
FIGS. 14 through 17 are flow charts showing one example of processing performed by the Group 3 facsimile apparatus in the embodiment of the present invention when a user performs transmission operation or polling document producing operation.
Figure 15:
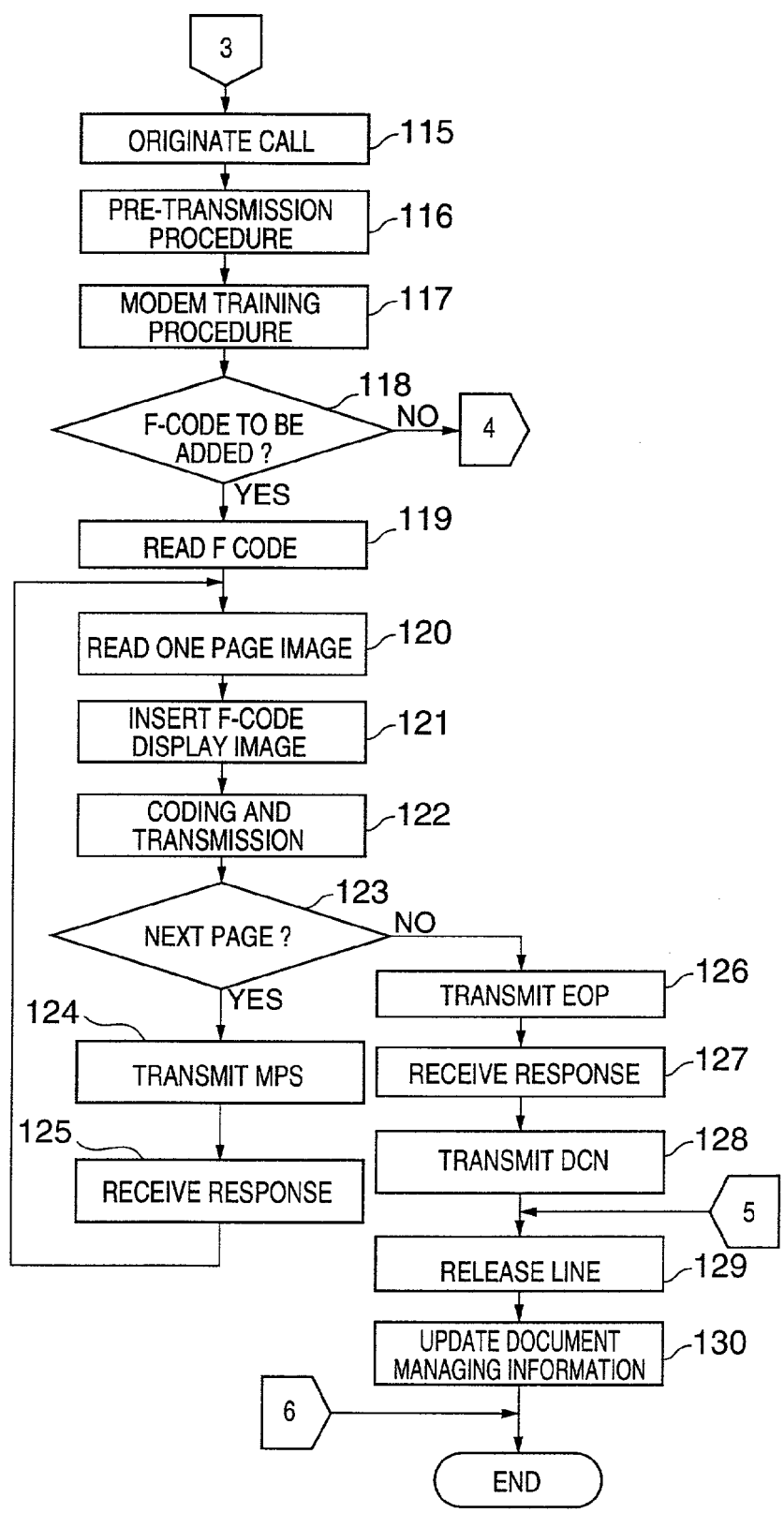
Figure 16:
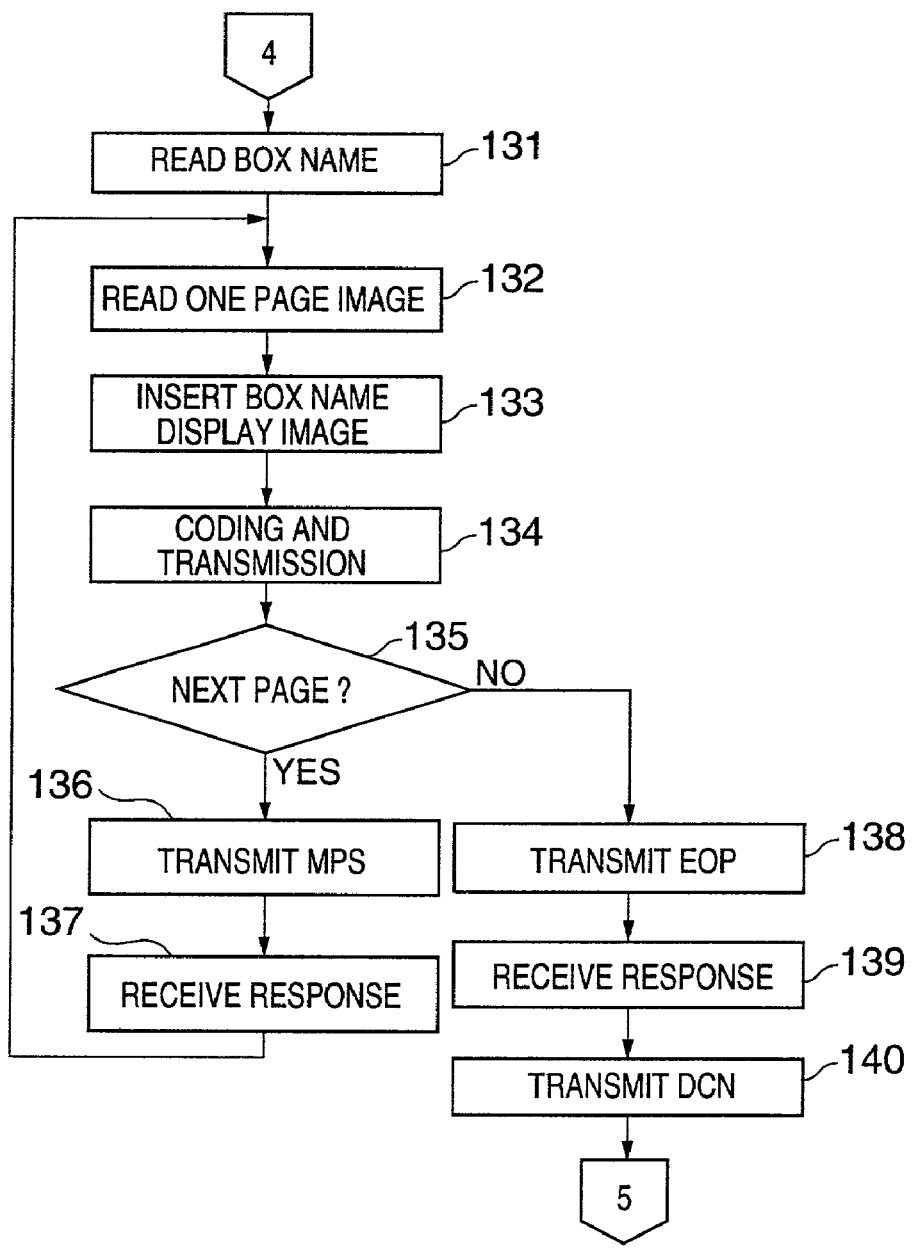
Figure 17:
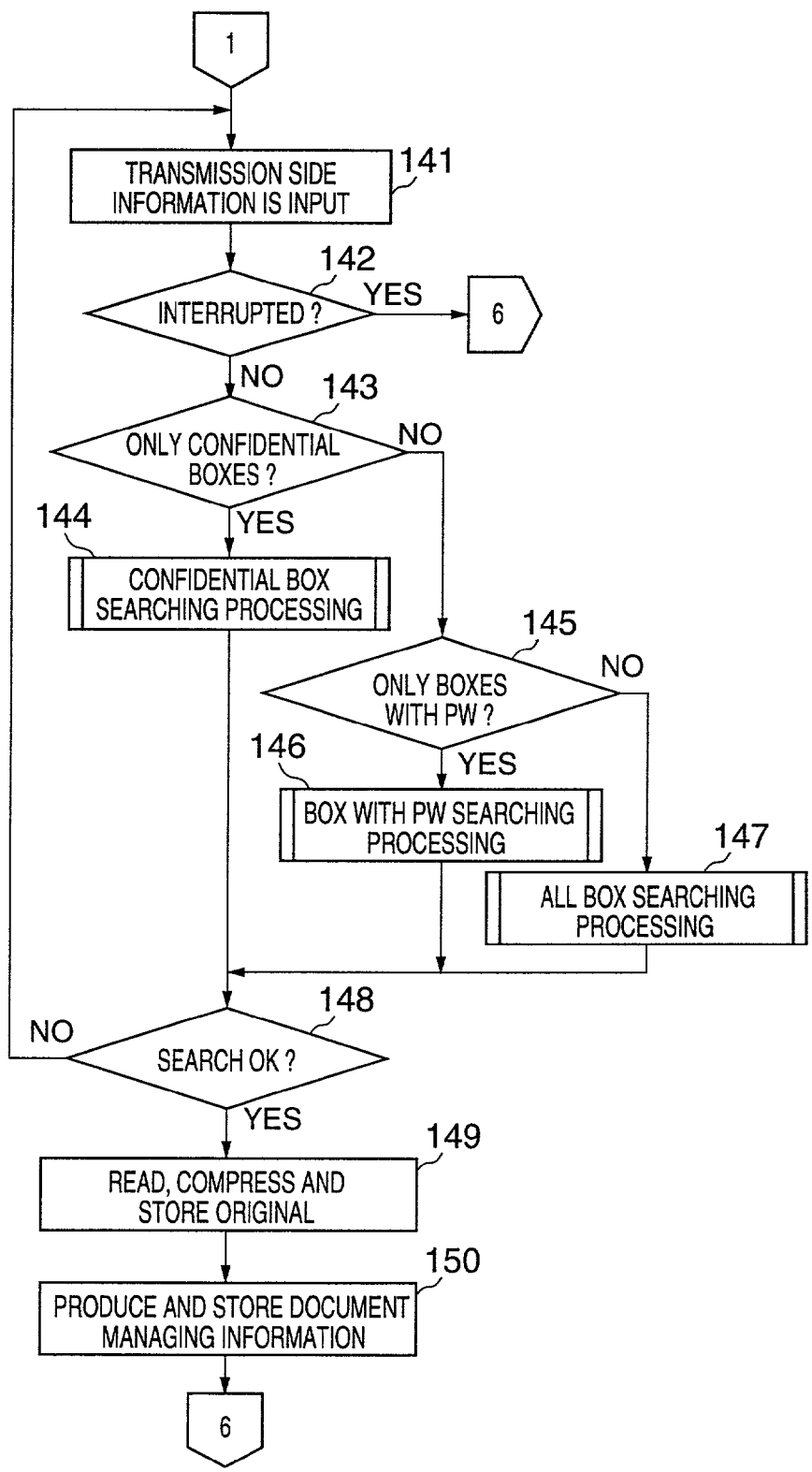

FIGS. 14, 15 and 16 show an example of processing performed by this Group 3 facsimile apparatus when a user performs transmission operation or polling document producing operation.

In this processing, the Group 3 facsimile apparatus monitors whether or not transmission operation or polling document producing operation is instructed to perform, in the loop of determinations of the steps 101 and 102 shown in FIG. 14. Then, when transmission operation is performed and the result of the determination of the step 101 becomes YES, the Group 3 facsimile apparatus requests the user to input a transmission destination and the user inputs the transmission destination (in a step 103).

Then, the Group 3 facsimile apparatus requests the user to input a transmission side information (sender's information) and the user inputs the transmission side information (in a step S104). When this step 104 is not interrupted (NO of a determination of a step 105), the contents of the thus-input transmission side information are verified.

Specifically, first, it is examined whether or not 'only confidential boxes' are specified as targets of search (in a determination of a step 106). Then, when the result of the determination of the step 106 is YES, predetermined confidential box searching processing (in a step 107, described later) is performed, and, it is examined whether or not the input transmission side information is registered as the F-code for any confidential box.

Further, when 'only confidential boxes' are not specified as targets of search and the result of the determination of the step 106 is NO, it is examined whether or not 'only boxes with passwords' are specified as targets of search (in a determination of a step 108).

When the result of the determination of the step 108 is YES, predetermined box with password searching processing (in a step 109, described later) is performed, and, it is examined whether or not the input transmission side information is registered as the F-code for any box with password.

Further, when neither 'only confidential boxes' nor 'only boxes with passwords' are specified targets of search and the result of the determination of the step 108 is NO, it is determined that 'all the boxes' are specified as targets of search.

Accordingly, in this case, predetermined all box searching processing (in a step 110, described later) is performed, and it is examined whether or not the input transmission side information is registered as the F-code for any box.

When the searching processing in the step 107, 109 or 110 is completed, it is determined whether the result of the search is 'success' (in a determination of a step 111). When the result of the search is 'failure', and the result of the determination of the step 111 is NO, the processing returns to the step 104, and the user is requested again to input transmission side information.

When the result of the search is 'success', and the result of the determination of the step 111 is YES, the Group 3 facsimile apparatus performs transmission operation which is requested at this time.

First, the Group 3 facsimile apparatus produces a set of document managing information such as that described above for a transmission job to be performed at this time (in a step 112).

Then, the Group 3 facsimile apparatus originates a call to the specified destination (in a step 115), performs a predetermined pre-transmission procedure and sets transmission functions to be used in the transmission together with the destination terminal (in a step 116), performs a predetermined modem training procedure, and determines the modem rate to be used in the transmission.

In the Group 3 facsimile apparatus, it is previously set whether an F-code is to be added or a box name is to be added, as identification information of a sender, to image information to be transmitted.

Then, it is examined that whether or not it is set that an F-code is to be added (in a determination of a step 118). When, the result of the determination of the step 118 is YES, the F-code is read from the set of box information identified using the box number registered as the identification information entry of the set of document managing information of this time (in a step S119).

Then, the Group 3 facsimile apparatus reads an original to be transmitted set in the scanner 5 (in a step 120), produces a display image of the F-code and inserts the display image in a predetermined area of the original image read in the step 120 (in a step 121), codes and compresses the thus-obtained image information through the coding/decoding portion 8 and transmits the thus-obtained image information to the destination terminal (in a step S122).

When completing transmission of one page of the image information, the Group 3 facsimile apparatus examines whether or not there is another page to be subsequently transmitted (in a determination of a step 123), and, when another original is set in the scanner 5 and the result of the determination of the step 123 is YES, transmits a signal MPS as a post-message signal to the destination terminal (in a step 124), and, when receiving a response signal from the destination terminal (in a step 125), the processing returns to the step 120, and the Group 3 facsimile apparatus transmits the page of image information to the destination terminal.

When transmission of all the pages of image information is completed and the result of the determination of the step 123 is NO, the Group 3 facsimile apparatus transmits a signal EOP as a post-message signal to the destination terminal (in a step 126), and, when receiving a response signal from the destination terminal (in a step 127), transmits a signal DCN to the destination terminal (in a step 128) and releases the line (in a step S129).

Then, based on the result of the transmission at this time, the Group 3 facsimile apparatus updates the set of document managing information (in a step 130), and completes the transmission operation.

When it is set that the box name is to be added and the result of the determination of the step 118 is NO, the Group 3 facsimile apparatus reads the box name from the set of box information identified using the box number registered as the identification information entry of the set of document managing information of this time (in a step 131).

Then, the Group 3 facsimile apparatus reads an original to be transmitted set in the scanner 5 (in a step 132), produces a display image of the box name and inserts the display image in a predetermined area of the original image read in the step 132 (in a step 133), codes and compresses the thus-obtained image information through the coding/decoding portion 8 and transmits the thus-obtained image information to the destination terminal (in a step S134).

When completing transmission of one page of the image information, the Group 3 facsimile apparatus examines whether or not there is another page to be subsequently transmitted (in a determination of a step 135), and, when another original is set in the scanner 5 and the result of the determination of the step 135 is YES, transmits a signal MPS as a post-message signal to the destination terminal (in a step 136), and, when receiving a response signal from the destination terminal (in a step 137), the processing returns to the step 132, and the Group 3 facsimile apparatus transmits the page of image information to the destination terminal.

When transmission of all the pages of image information is completed and the result of the determination of the step 135 is NO, the Group 3 facsimile apparatus transmits a signal EOP as a post-message signal to the destination terminal (in a step 138), and, when receiving a response signal from the destination terminal (in a step 139), transmits a signal DCN to the destination terminal (in a step 140), the processing shifts to the step 129, and the Group 3 facsimile apparatus performs the subsequent steps.

When the user cancels the operation of inputting the transmission side information halfway and the result of the determination of the step 105 is YES, the Group 3 facsimile apparatus discontinues the transmission operation at the time.

When a user operates the Group 3 facsimile apparatus for producing a polling transmission document and the result of the determination of the step 102 is YES, the Group 3 facsimile apparatus requests the user to input transmission side information (sender's information) and the user inputs the transmission side information (in a step S141). When this step 141 is not interrupted (NO of a determination of a step 142), the contents of the thus-input transmission side information are verified.

Specifically, first, it is examined whether or not 'only confidential boxes' are specified as targets of search (in a determination of a step 143). Then, when the result of the determination of the step 143 is YES, the predetermined confidential box searching processing (in a step 144, described later) is performed, and, it is examined whether or not the input transmission side information is registered as the F-code for any confidential box.

Further, when 'only confidential boxes' are not specified as targets of search and the result of the determination of the step 143 is NO, it is examined whether or not 'only boxes with passwords' are specified as targets of search (in a determination of a step 145).

When the result of the determination of the step 145 is YES, the predetermined box with password searching processing (in a step 146, described later) is performed, and, it is examined whether or not the input transmission side information is registered as the F-code for any box with password.

Further, when neither 'only confidential boxes' nor 'only boxes with passwords' are specified as targets of search and the result of the determination of the step 145 is NO, it is determined that all the boxes are specified as targets of search.

Accordingly, in this case, the predetermined all box searching processing (in a step 147, described later) is performed, and it is examined whether or not the input transmission side information is registered as the F-code for any box.

When the searching processing in the step 144, 146 or 147 is completed, it is determined whether or not the result of the search is 'success' (in a determination of a step 148). When the result of the search is 'failure', and the result of the determination of the step 148 is NO, the processing returns to the step 141, and the Group 3 facsimile apparatus requests the user to again input transmission side-information.

When the result of the search is 'success', and the result of the determination of the step 148 is YES, the Group 3 facsimile apparatus performs polling document producing operation which is requested at the time.

First, the Group 3 facsimile apparatus reads each original set in the scanner 5, codes and compresses the thus-obtained image information through the coding/decoding portion 8, and stores the thus-obtained image information in the image storing device 9 (in a step 149).

Then, the Group 3 facsimile apparatus produces and stores a set of document managing information such as that described above for a job of transmitting the document information stored in the step 149 (in a step 150), and completes the polling document producing operation. The box number obtained as a result of the searching processing in the step 144, 146 or 147 can be used as the box number of the set of document managing information produced in the step 150.

When the user cancels the operation of inputting the transmission side information halfway and the result of the determination of the step 142 is YES, the Group 3 facsimile apparatus discontinues the polling document producing operation at the time.

Thus, in this embodiment of the present invention, information (F-code or box name) which is obtained by referring to the box number is used as transmission side information to be inserted into an image when the image information is transmitted. As a result, it is not necessary to use special information as information to specify transmission side information, and it is possible to limit the size of the set of document managing information to a small one. Thereby, it is possible to reduce the necessary memory capacity of the system memory 2, and to reduce the cost of the apparatus.

In the above-described processing, the display image of the F-code or the display image of the box name is inserted in each page of the image information to be transmitted. However, the method of inserting the display image of the F-code or the display image of the box name into the image information to be transmitted is not limited to this. Instead, it is also possible that the display image of the F-code or the display image of the box name is inserted in at least any one page of the image information to be transmitted.

Figure 18:
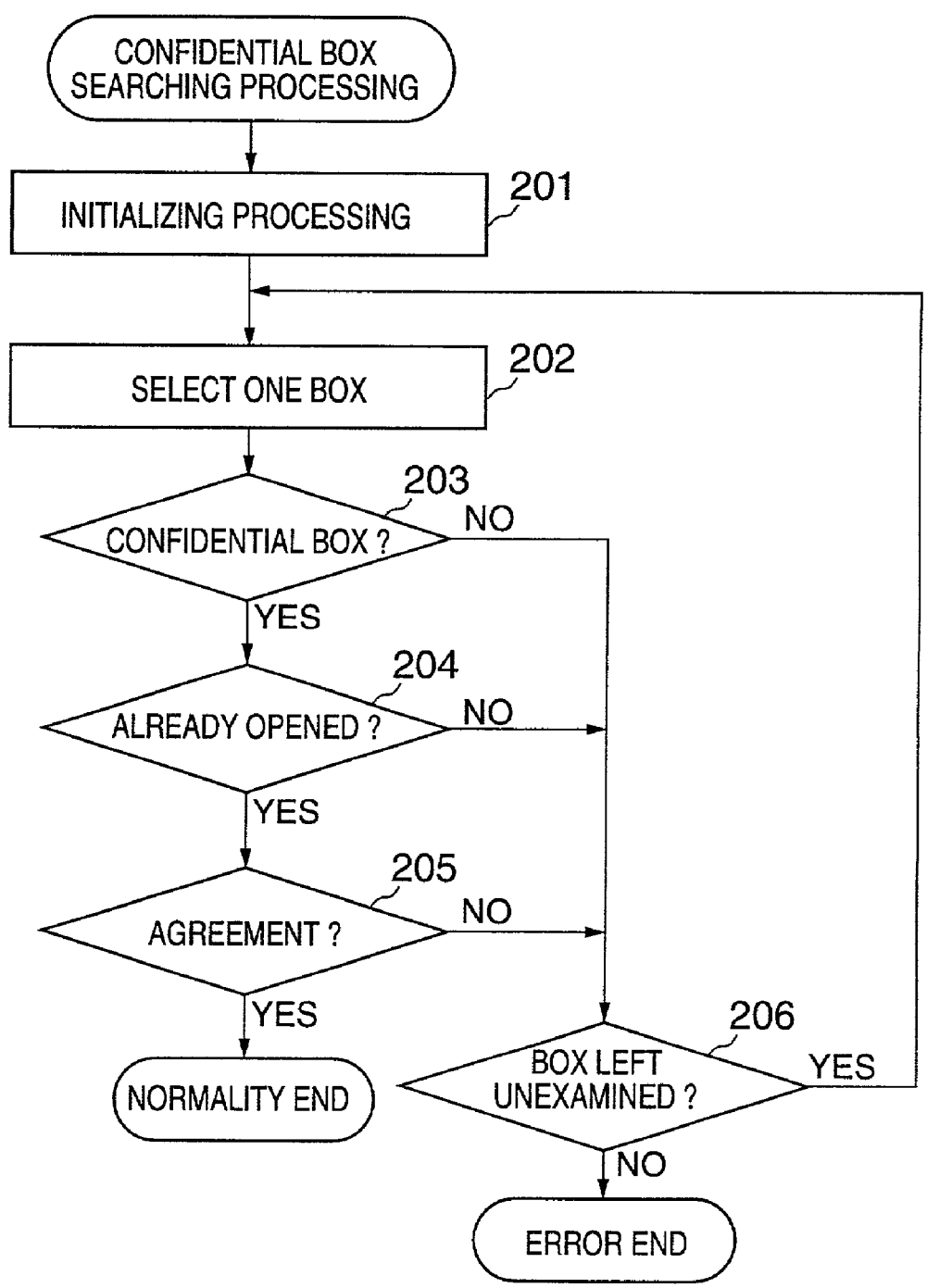
FIG. 18 is a flow chart showing one example of confidential box searching processing.

FIG. 18 shows one example of the confidential box searching processing (each of the steps 107 and 144).

First, each parameter of the searching processing is initialized (in a step 201).

Then, one box (set of box information) is selected (in a step 202), it is examined whether or not the box type entry of the thus-selected set of box information is 'confidential box' (in a determination of a step 203), then, when the result of the determination of the step 203 is YES, it is examined whether or not the box has been already opened (in a determination of a step 204), and, then, when the result of the determination of the step 204 is YES, it is examined whether or not the value registered as the F-code entry of the set of box information agrees with the value of the F-code which is the target of the search (in a determination of a step 205).

When the result of the determination of the step 205 is YES, the confidential box searching processing at this time is finished in normality. That is, in this case, as the result of the searching processing, 'success' is returned.

When the result of the determination of the step 203 is NO, the result of the determination of the step 204 is NO or the result of the determination of the step 205 is NO, it is determined whether or not another set of box information is left unexamined (in a determination of a step 206). When the result of the determination of the step 206 is YES, the processing returns to the step 202, and the same examination is performed on the another set of box information.

When it is determined that there is not any set of box information, the F-code entry of which agrees with the F-code which is the target of the search, after the contents of the sets of box information of all the already-opened confidential boxes are examined, and the result of the determination of the step 206 is NO, the confidential box searching processing is finished in error. That is, in this case, 'failure' is returned as the result of the search.

Thus, in the confidential box searching processing, because the targets to be searched are limited to the already-opened confidential boxes, the processing speed is high in comparison to the case where all the boxes are the targets to be searched.

Figure 19:
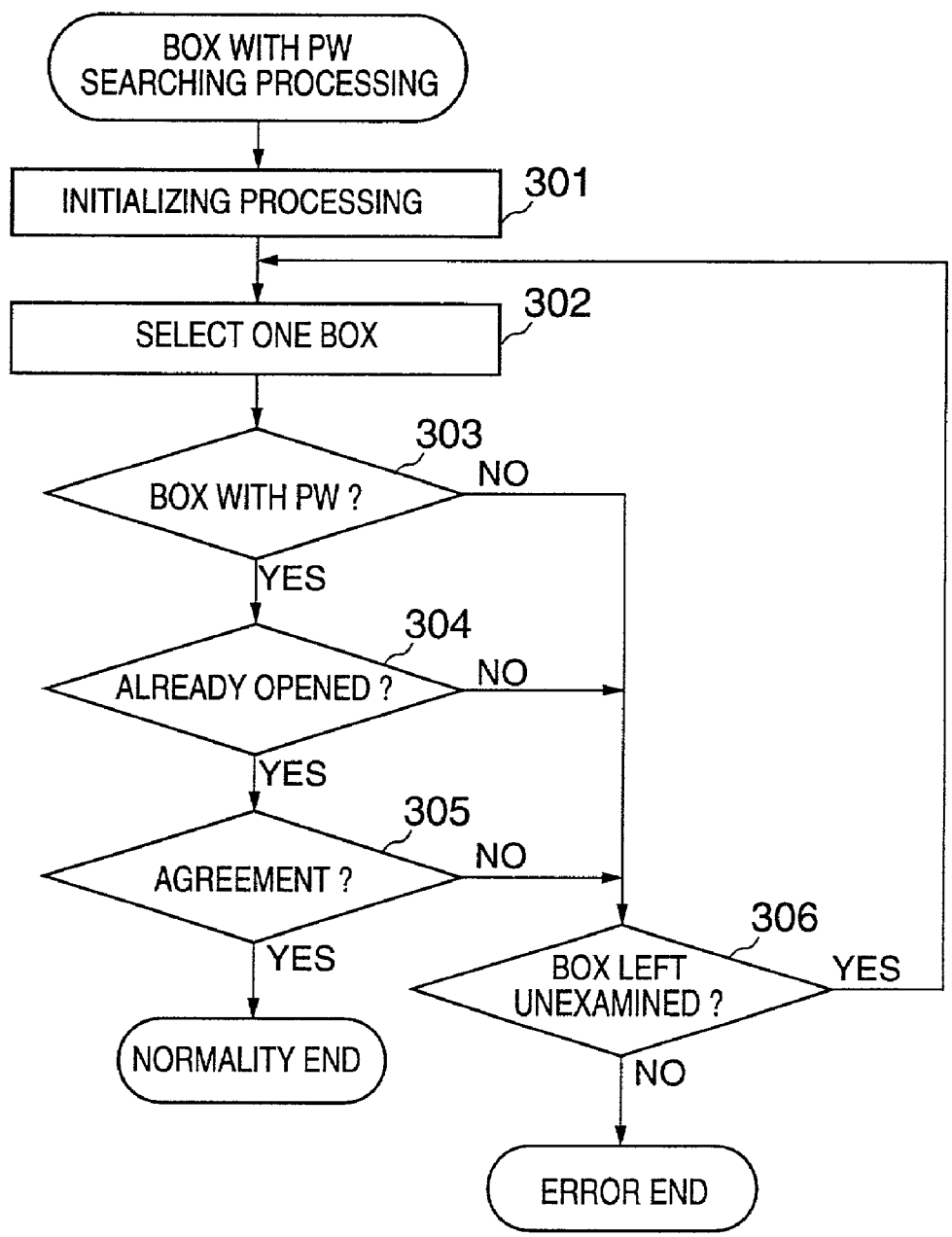
FIG. 19 is a flow chart showing one example of box with password searching processing.

FIG. 19 shows one example of the box with password searching processing (each of the steps 109 and 146).

First, each parameter of the searching processing is initialized (in a step 301).

Then, one box (set of box information) is selected (in a step 302), it is examined whether or not the box type entry of the thus-selected set of box information is 'box with password' (in a determination of a step 303), then, when the result of the determination of the step 303 is YES, it is examined whether or not the box has been already opened (in a determination of a step 304), and, then, when the result of the determination of the step 304 is YES, it is examined whether or not the value registered as the F-code entry of the set of box information agrees with the value of the F-code which is the target of the search (in a determination of a step 305).

When the result of the determination of the step 305 is YES, the box with password searching processing at this time is finished in normality. That is, in this case, as the result of the searching processing, 'success' is returned.

When the result of the determination of the step 303 is NO the result of the determination of the step 304 is NO or the result of the determination of the step 305 is NO, it is examined whether or not another set of box information is left unexamined (in a determination of a step 306). When the result of the determination of the step 306 is YES, the processing returns to the step 302, and the same examination is performed on the another set of box information.

When it is determined that there is not any set of box information, the F-code entry of which agrees with the F-code which is the target of the search, after the contents of the sets of box information of all the already-opened boxes with passwords are examined, and the result of the determination of the step 306 is NO, the box with password searching processing is finished in error. That is, in this case, 'failure' is returned as the result of the search.

Thus, in the box with password searching processing, because the targets to be searched are limited to the already-opened boxes with passwords, the processing speed is high in comparison to the case where all the boxes are the targets to be searched.

Further, in the box with password searching processing, when the result of the determination of the step 305 becomes YES, the Group 3 facsimile apparatus requests the user to input password, and performs authentication processing in which the input password is compared with the password registered in the set of box information. Thereby, it is possible to perform more positive user authentication.

Figure 20:
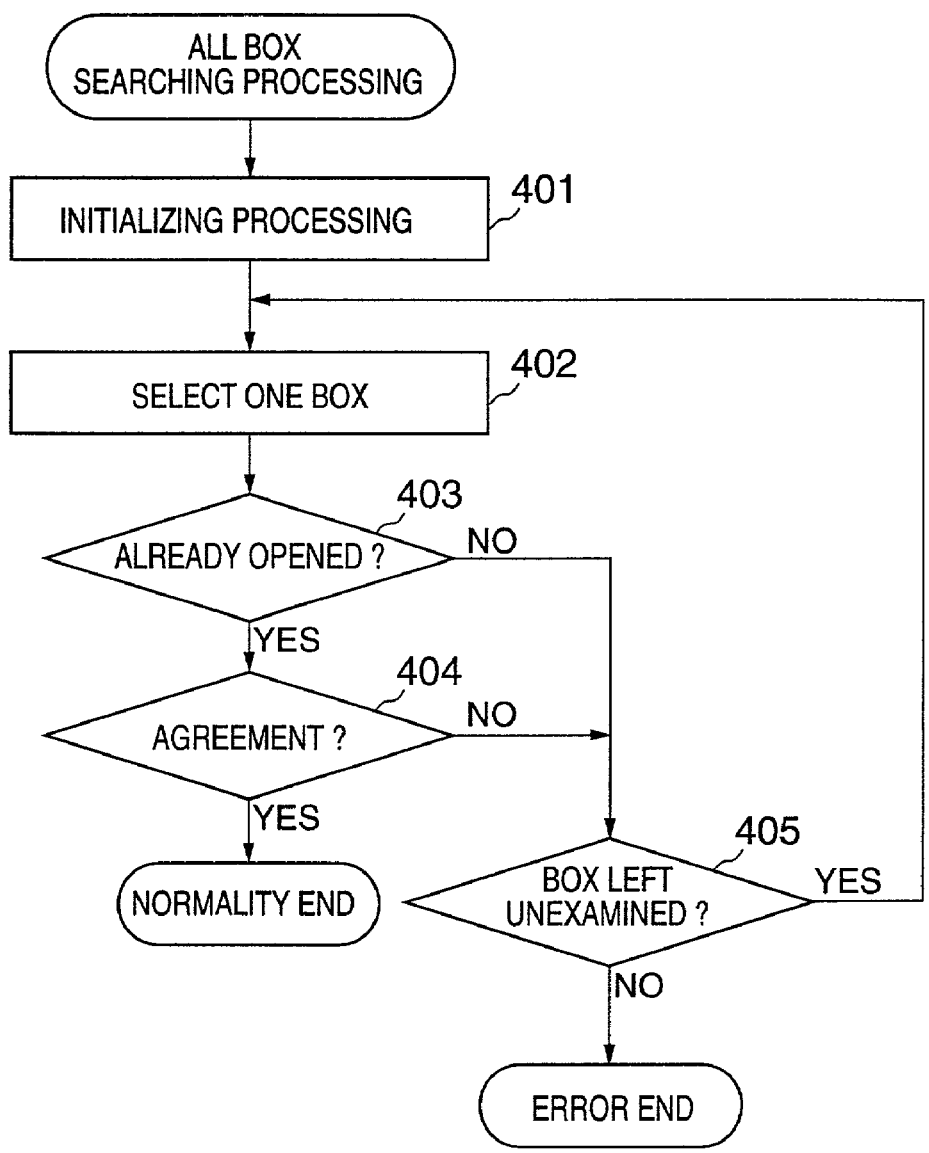
FIG. 20 is a flow chart showing one example of all box searching processing.

FIG. 20 shows one example of the all box searching processing (each of the steps 110 and 147).

First, each parameter of the searching processing is initialized (in a step 401).

Then, one box (set of box information) is selected (in a step 402), it is examined whether or not the box has been already opened (in a determination of a step 403), and, then, when the result of the determination of the step 403 is YES, it is examined whether or not the value registered as the F-code entry of the set of box information agrees with the value of the F-code which is the target of the search (in a determination of a step 404).

When the result of the determination of the step 404 is YES, the all box searching processing at this time is finished in normality. That is, in this case, as the result of the searching processing, 'success' is returned.

When the result of the determination of the step 403 is NO or the result of the determination of the step 404 is NO, it is determined whether or not another set of box information is left unexamined (in a determination of a step 405). When the result of the determination of the step 405 is YES, the processing returns to the step 402, and the same examination is performed on the another set of box information.

When it is determined that there is not any set of box information, the F-code entry of which agrees with the F-code which is the target of the search; after the contents of the sets of box information of all the already-opened boxes are examined, and the result of the determination of the step 405 is NO, the all box searching processing is finished in error. That is, in this case, 'failure' is returned as the result of the search.

Figure 21:
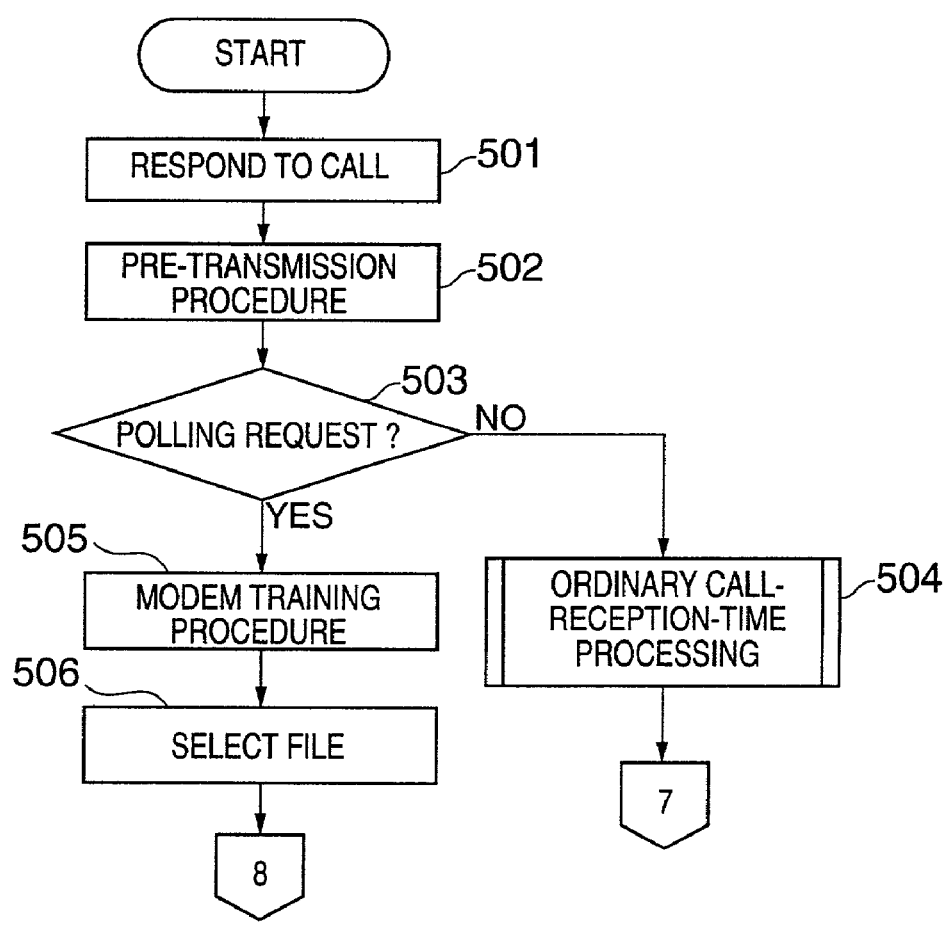
FIGS. 21 through 23 are a flow chart showing one example of processing performed by the Group 3 facsimile apparatus in the embodiment of the present invention when a call is coming.
Figure 22:
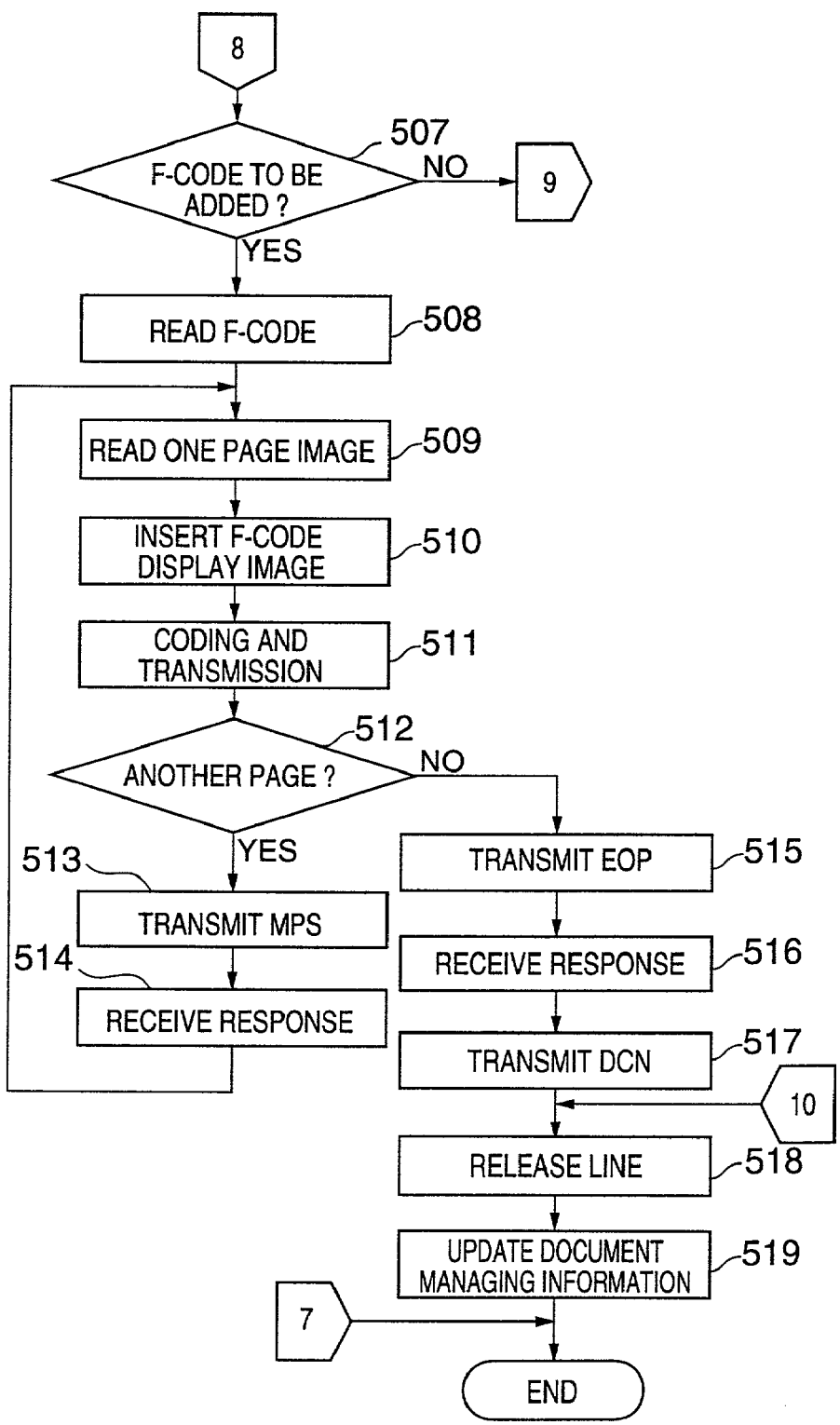
Figure 23:
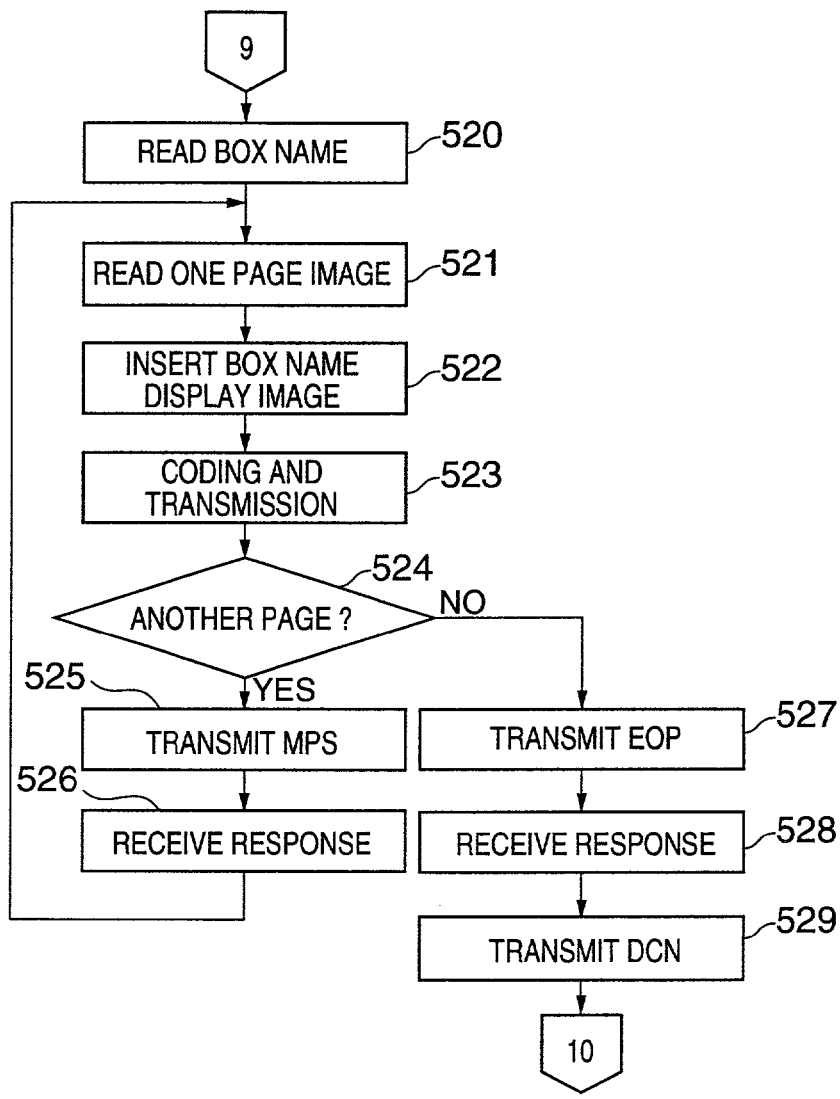

FIGS. 21, 22 and 23 show one example of processing performed by this Group 3 facsimile apparatus when a call is coming to the Group 3 facsimile apparatus.

When detecting a call incoming, the Group 3 facsimile apparatus responds to the call, performs a predetermined pre-transmission procedure with the calling terminal, and performs confirming and setting of transmission functions and so forth (in a step 502).

Then, the Group 3 facsimile apparatus examines whether or not a polling request is made by the call originating terminal (in a determination of a step 503), and, when the result of the determination of the step 503 is NO, performs ordinary processing (in a step 504) which is to be performed when a call is coming, and finishes the operation which is to be performed when a call is coming.

When a polling request is made by the call originating terminal and the result of the determination of the step 503 is YES, the Group 3 facsimile apparatus performs the modem training procedure, determines the modem rate to be used (in a step 505), and selects a file to be transmitted at this time (in a step 506). For example, when an F-code is specified by the call originating terminal through a signal SEP, the Group 3 facsimile apparatus selects image information in the box corresponding to that F-code as the file to be transmitted. On the other cases, the Group 3 facsimile apparatus selects image information which is prepared for free polling as the file to be transmitted.

Then, the Group 3 facsimile apparatus examines whether or not it is set in itself that an F-code is to be added as the transmission side information (in a determination of a step 507), and, when the result of the determination of the step 507 is YES, the Group 3 facsimile apparatus reads the F-code from the set of box information having the box number registered as the identification information entry of the set of document managing information corresponding to the file selected in the step 506 (in a step 508).

Then, the Group 3 facsimile apparatus reads one page of image information of the file selected in the step 506 from the image storing device 9, decodes the thus-read image information into the original image information through the coding/decoding portion 8 (in a step 509), and, inserts a display image of the F-code produced based on the F-code read in the step 508 into a predetermined display area of the page of the image obtained in the step 509 (in a step 510), and, codes and compresses the thus-obtained image information, and transmits the thus-obtained image information to the call originating terminal (in a step 511).

When finishing transmission of the page of image information, the Group 3 facsimile apparatus examines whether or not there is any other page to be transmitted (in a determination of a step 512). When there is a page to be transmitted subsequently and the result of the determination of the step 512 is YES, the Group 3 facsimile apparatus transmits a signal MPS as a post-message signal to the call originating terminal (in a step 513), and, when receiving a response signal from the call originating terminal (in a step S514), the processing returns to the step 509, and the Group 3 facsimile apparatus transmits the page of image information to the call originating terminal.

When finishing transmission of all the pages of image information and the result of the determination of the step 512 is NO, the Group 3 facsimile apparatus transmits a signal EOP as a post-message signal to the call originating terminal (in a step 515), and, when receiving a response signal from the call originating terminal in a step 516, transmits a signal DCN to the call originating terminal (in a step 517), and releases the line (in a step 518).

Then, the Group 3 facsimile apparatus updates the contents of the set of document managing information based on the result of the polling transmission at this time (in a step 519), and finishes the polling transmission operation.

When it is set in the Group 3 facsimile apparatus itself that the box name is to be added as the transmission side information and the result of the determination of the step 507 is NO, reads the box name from the set of box information having the box number registered as the identification information entry of the set of document managing information corresponding to the file selected in the step 506 (in a step 520).

Then, the Group 3 facsimile apparatus reads one page of image information of the file selected in the step 506 from the image storing device 9, decodes the thus-read image information into the original image information through the coding/decoding portion 8 (in a step 521), and, inserts a display image of the box name produced based on the box name read in the step 520 into a predetermined display area of one page of image obtained in the step 521 (in a step 522), and, codes and compresses the thus-obtained image information, and transmits the thus-obtained image information to the call originating terminal (in a step 523).

When finishing transmission of the page of image information, the Group 3 facsimile apparatus examines whether or not there is any other page to be transmitted (in a determination of a step 524). When there is a page to be transmitted subsequently and the result of the determination of the step 524 is YES, the Group 3 facsimile apparatus transmits a signal MPS as a post-message signal to the call originating terminal (in a step 525), and, when receiving a response signal from the call originating terminal (in a step 526), the processing returns to the step 521, and the Group 3 facsimile apparatus transmits the page of image information.

When finishing transmission of all the pages of image information and the result of the determination of the step 524 is NO, the Group 3 facsimile apparatus transmits a signal EOP as a post-message signal to the call originating terminal (in a step 527), and, when receiving a response signal from the call originating terminal (in a step 528), transmits a signal DCN to the call originating terminal (in a step 529), the processing returns to the step 518, and the Group 3 facsimile apparatus performs the subsequent steps.

Thus, in this embodiment of the present invention, information (F-code or box name) which is obtained by referring to the box number is used as the transmission side information to be inserted in to the image when polling transmission is performed. As a result, it is not necessary to use special information as information to specify the transmission side information, and it is possible to limit the size of the set of document managing information to a small one. Thereby, it is possible to reduce the necessary memory capacity of the system memory 2, and to reduce the cost of the apparatus.

Further, because user authentication and specification of the box can be performed by using a single F-code in common, it is very easy for a user to use the apparatus and the apparatus is very convenient for the user in comparison to a case where a plurality of pieces of information for authentication are used.

In the above-described processing, the display image of the F-code or the display image of the box name is inserted in each page of the image information to be transmitted. However, the method of inserting the display image of the F-code or the display image of the box name into the image information to be transmitted is not limited to this. Instead, it is also possible that the display image of the F-code or the display image of the box name is inserted in at least any one page of the image information to be transmitted.

Figure 24:
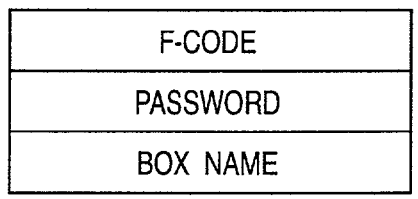
FIG. 24 illustrates another example of a set of box information.

In the above-described embodiment, sets of box information each such as that shown in FIG. 2 are used. However, instead, sets of box information each such as that shown in FIG. 24 may be used. In the set of box information shown in FIG. 24, the box type entry is deleted in comparison to that shown in FIG. 2. Accordingly, the searching processing using the F-code input by a user is either one of the box with password searching processing and the all box searching processing.

In this case, in the box with password searching processing, only the boxes for which a previously specified effective password or previously specified respective effective passwords are registered are treated as targets of the search. Further, when the box for which the F-code having the value same as that of the F-code input by the user is found through the search, authentication operation using the password registered for the thus-found box is performed as mentioned above. For example, the Group 3 facsimile apparatus requests the user to input a password, and compares the thus-input password with the passwords registered for the found box. Then, only when the authentication operation succeeds, that is, in the above-mentioned example, only when the passwords input by the user agrees with the password registered for the found box, the box with password searching processing completes in normality, and, the Group 3 facsimile apparatus performs the job (transmission of image information or production of polling document) requested by the user through the operation performed by the user on the Group 3 facsimile apparatus.

Figure 25:
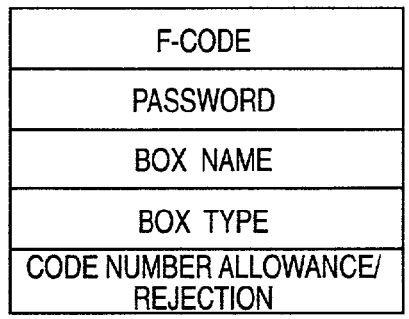
FIG. 25 illustrates another example of a set of box information.

Contrary thereto, sets of box information each such as that shown in FIG. 25 may be used, instead. In the set of box information shown in FIG. 25, a code number allowance/rejection entry for specifying whether or not this set of box information can be used for user authentication is added in comparison to that shown in FIG. 2.

Figure 26:
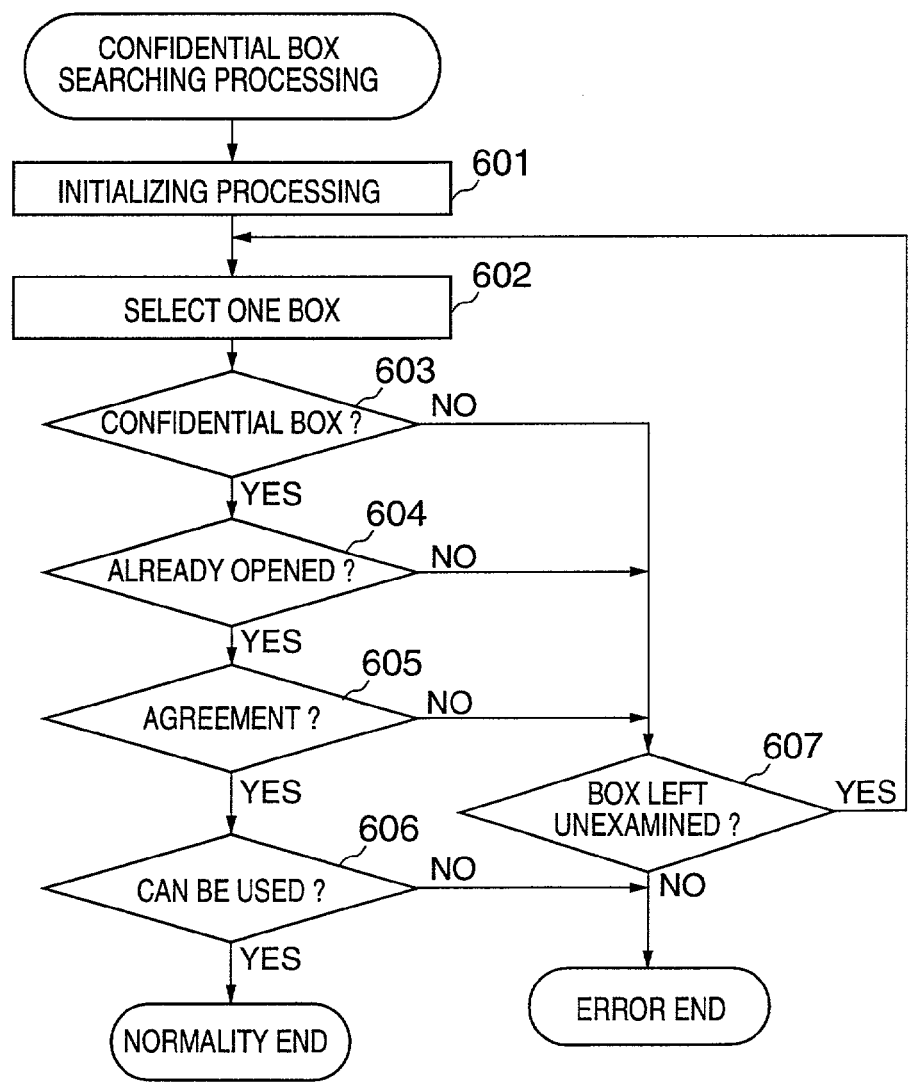
FIG. 26 is a flow chart showing another example of the confidential box searching processing

FIG. 26 shows one example of the confidential box searching processing (each of the steps 107 and 144) performed in this case.

First, each parameter of the searching processing is initialized (in a step 601).

Then, one box (set of box information) is selected (in a step 602), it is examined whether or not the box type entry of the thus-selected set of box information is 'confidential box' (in a determination of a step 603), then, when the result of the determination of the step 603 is YES, it is examined whether or not the box has been already opened (in a determination of a step 604), and, then, when the result of the determination of the step 604 is YES, it is examined whether or not the value registered as the F-code entry of the set of box information agrees with the value of the F-code which is the target of the search (in a determination of a step 605).

When the result of the determination of the step 605 is YES, it is examined whether or not the contents of the code number allowance/rejection entry of the set of box information is 'allowance' (in a determination of a step 606), and, when the result of the determination of the step 606 is YES, the confidential box searching processing at this time is finished in normality. That is, in this case, as the result of the searching processing, 'success' is returned.

When the result of the determination of the step 603 is NO, the result of the determination of the step 604 is NO or the result of the determination of the step 605 is NO, it is determined whether or not another set of box information is left unexamined (in a determination of a step 607). When the result of the determination of the step 607 is YES, the processing returns to the step 602, and the same examination is performed on the another set of box information.

When it is determined that there is not any set of box information, the F-code entry of which agrees with the F-code which is the target of the search, after the contents of the sets of box information of all the already-opened confidential boxes are examined, and the result of the determination of the step 607 is NO, or the result of the determination of the step 606 is NO, the confidential box searching processing is finished in error. That is, in this case, 'failure' is returned as the result of the search.

Figure 27:
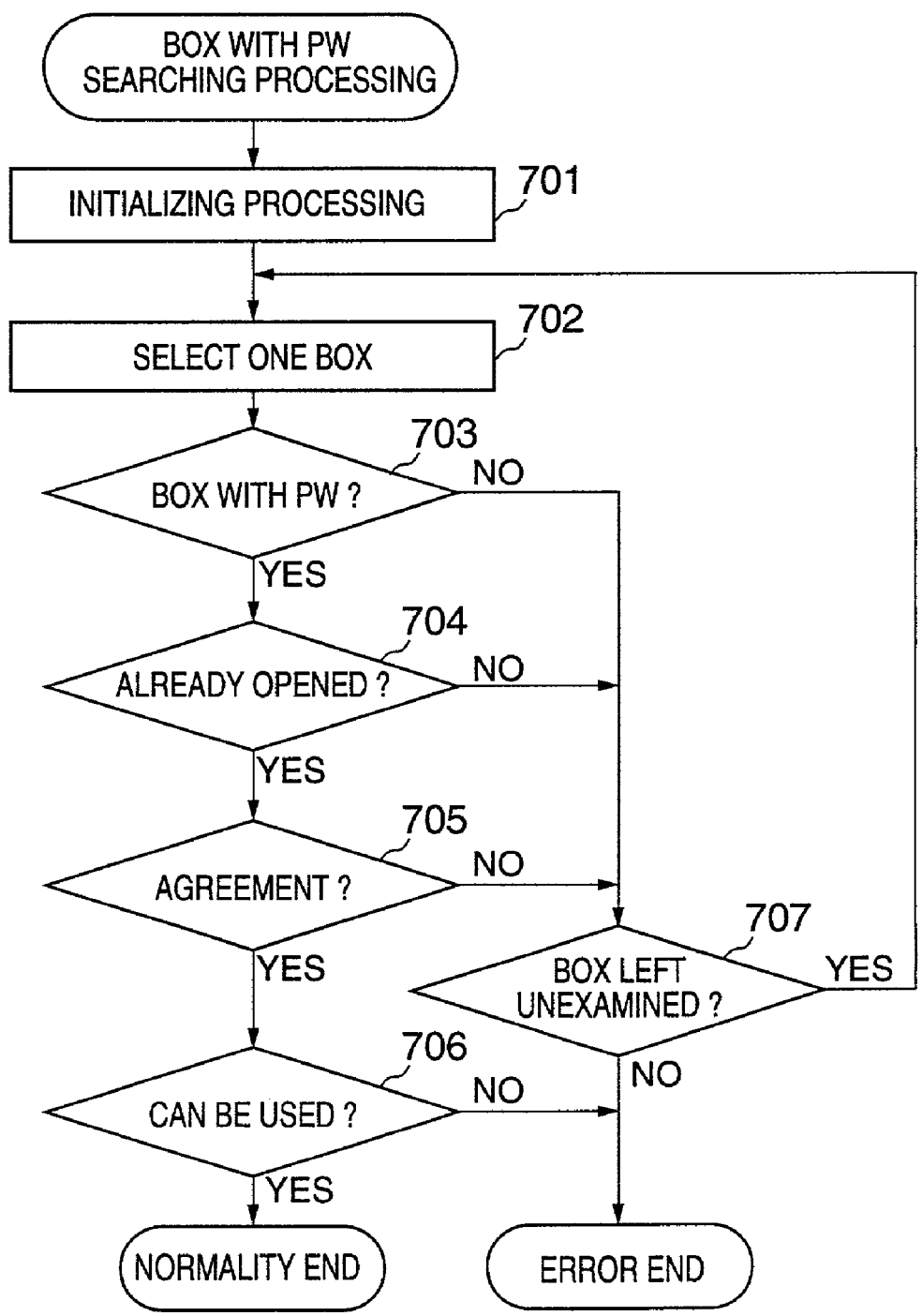
FIG. 27 is a flow chart showing another example of the box with password searching processing.

FIG. 27 shows one example of the box with password searching processing (each of the steps 109 and 146) performed in the case where sets of box information each such as that shown in FIG. 25 are used.

First, each parameter of the searching processing is initialized (in a step 701).

Then, one box (set of box information) is selected (in a step 702), it is examined whether or not the box type entry of the thus-selected set of box information is 'box with password' (in a determination of a step 703), then, when the result of the determination of the step 703 is YES, it is examined whether or not the box has been already opened (in a determination of a step 704), and, then, when the result of the determination of the step 704 is YES, it is examined whether or not the value registered as the F-code entry of the set of box information agrees with the value of the F-code which is the target of the search (in a determination of a step 705).

When the result of the determination of the step 705 is YES, it is examined whether or not the code number allowance/rejection entry of the set of box information is 'allowance' (in a determination of a step 706), and, when the result of the determination of the step 706 is YES, the box with password searching processing at this time is finished in normality. That is, in this case, as the result of the searching processing, 'success' is returned.

When the result of the determination of the step 703 is NO, the result of the determination of the step 704 is NO or the result of the determination of the step 705 is NO, it is examined whether or not another set of box information is left unexamined (in a determination of a step 707). When the result of the determination of the step 707 is YES, the processing returns to the step 702, and the same examination is performed on the another set of box information.

When it is determined that there is not any set of box information, the F-code entry of which agrees with the F-code which is the target of the search, after the contents of the sets of box information of all the already-opened boxes with passwords are examined, and the result of the determination of the step 707 is NO, or the result of the determination of the step 706 is NO, the box with password searching processing is finished in error. That is, in this case, 'failure' is returned as the result of the search.

FIG. 28 shows one example of the all box searching processing (each of the steps of 110 and 147) performed in the case where sets of box information each such as that shown in FIG. 25 are used.

First, each parameter of the searching processing is initialized (in a step 801).

Then, one box (set of box information) is selected (in a step 802), it is examined whether or not the box has been already opened (in a determination of a step 803), then, when the result of the determination of the step 803 is YES, it is examined whether or not the value registered as the F-code entry of the thus-selected set of box information agrees with the value of the F-code which is the target of the search (in a determination of a step of a step 804).

When the result of the determination of the step 804 is YES, it is determined whether the contents of the code number allowance/rejection entry of the set of box information is 'allowance' (in a determination of a step of a step 805), and, when the result of the determination of the step 805 is YES, the all box searching processing at this time is finished in normality. That is, in this case, as the result of the searching processing, 'success' is returned.

When the result of the determination of the step 803 is NO or the result of the determination of the step 804 is NO, it is determined whether or not another set of box information is left unexamined (in a determination of a step of a step 806). When the result of the determination of the step 806 is YES, the processing returns to the step 802, and the same examination is performed on the another set of box information.

When it is determined that there is not any set of box information, the F-code entry of which agrees with the F-code which is the target of the search, after the contents of the sets of box information of all the already-opened boxes are examined, and the result of the determination of the step 806 is NO, or the result of the determination of the step 805 is NO, the all box searching processing is finished in error. That is, in this case, 'failure' is returned as the result of the search.

Thus, in this case where sets of box information each such as that shown in FIG. 25 are used, whether or not user authentication using the box information is allowed is set based on the code number allowance/rejection entry of the set of box information. Thereby, it is possible that the Group 3 facsimile apparatus can specify a user who cannot use this apparatus. Thus, user restriction can be performed more effectively.

In the above-described embodiment, the present invention is applied to a facsimile apparatus which uses PSTN as a transmission path therefor. However, it is also possible that the present invention is applied to a facsimile apparatus which uses ISDN as a transmission path therefor.

Further, the present invention is not limited to the above-described embodiment, and variations and modifications may be made without departing from the scope of the present invention.

The present application is based on Japanese priority application Nos. 11-179329 and 11-096093, filed on Jun. 25, 1999 and Apr. 2, 1999, respectively, the entire contents of which are hereby incorporated by reference.

What is claimed is:

1. A facsimile apparatus, provided with boxes each corresponding to an F-code which is received through a facsimile transmission procedure, executing a center-machine application using the corresponding box based on sub-address information when receiving image information, said apparatus comprising:
a scanner configured to scan a document and generate facsimile image information corresponding to the scanned document;
a plotter configured to print a received facsimile image;
an F-code input requesting portion which requests a user to input an F-code when the user operates said apparatus for performing transmission; and
a control portion which searches for the box for which an F-code is registered, the value of which F-code agrees with the value of the F-code input by the user, and, only when finding said box, agrees to accept the facsimile image transmission operation performed by the user, and registers, in document managing information for managing a transmission job relating to the transmission operation, identification information for said box as authentication information.

2. The facsimile apparatus as claimed in claim 1, further comprising a transmission control portion which, when image information is transmitted, reads the F-code registered for the box corresponding to the authentication information registered in the document managing information, and inserts information indicating said F-code in at least any one page of the image information.

3. The facsimile apparatus as claimed in claim 1, further comprising a transmission control portion which, when image information is transmitted, reads the box name registered for the box corresponding to the authentication information registered in the document managing information, and inserts information indicating said box name in at least any one page of the image information.

4. The facsimile apparatus as claimed in claim 1, wherein a password for authentication is registered for each box, and, said control portion, when searching for the box for which the same value as that of the input F-code is registered, treats only the boxes for which an effective password is registered or respective effective passwords are registered as targets of the search.

5. The facsimile apparatus as claimed in claim 4, wherein said control portion, when finding said box, performs authentication operation using the password registered for said box, and, only when the authentication operation succeeds, agrees to accept the operation performed by the user.

6. A facsimile apparatus, provided with boxes each corresponding to an F-code which is received through a facsimile transmission procedure, executing a center-machine application using the corresponding box based on sub-address information when receiving image information, said apparatus comprising:
a scanner configured to scan a document and generate facsimile image information corresponding to the scanned document;
a plotter configured to print a received facsimile image;
an F-code input requesting portion which requests a user to input an F-code when the user operates said apparatus for producing a polling document; and
a control portion which searches for the box for which an F-code is registered, the value of which F-code agrees with the value of the F-code input by the user, and, only when finding said box, agrees to accept the facsimile polling document producing operation performed by the user, and registers, in document managing information for managing a job relating to the polling document producing operation, identification information for said box as authentication information.

7. The facsimile apparatus as claimed in claim 6, wherein a password for authentication is registered for each box, and, said control portion, when searching for the box for which the same value as that of the input F-code is registered, treats only the boxes for which an effective password is registered or respective effective passwords are registered as targets of the search.

8. The facsimile apparatus as claimed in claim 7, wherein said control portion, when finding said box, performs authentication operation using the password registered for said box, and, only when the authentication operation succeeds, agrees to accept the operation performed by the user.

9. A facsimile apparatus, provided with boxes each corresponding to an F-code which is received through a facsimile transmission procedure, executing a center-machine application using the corresponding box based on sub-address information when receiving image information, said apparatus comprising:
a scanner configured to scan a document and generate facsimile image information corresponding to the scanned document;
a plotter configured to print a received facsimile image;
an F-code input requesting portion which requests a user to input an F-code either when the user operates said apparatus for performing transmission or when the user operates said apparatus for producing a polling document;
a control portion which searches for the box for which an F-code is registered, the value of which F-code agrees with the value of the F-code input by the user, and, only when finding said box, either agrees to accept the transmission operation performed by the user, and registers, in document managing information for managing a transmission job relating to the facsimile image transmission operation, identification information for said box as authentication information, or agrees to accept the polling document producing operation performed by the user, and registers, in document managing information for managing a job relating to the polling document producing operation, identification information for said box as authentication information.

10. The facsimile apparatus as claimed in claim 9, wherein a password for authentication is registered for each box, and, said control portion, when searching for the box for which the same value as that of the input F-code is registered, treats only the boxes for which an effective password is registered or respective effective passwords are registered as targets of the search.

11. The facsimile apparatus as claimed in claim 10, wherein said control portion, when finding said box, performs authentication operation using the password registered for said box, and, only when the authentication operation succeeds, agrees to accept the operation performed by the user.

12. A facsimile apparatus, provided with boxes each corresponding to an F-code which is received through a facsimile transmission procedure, executing a center-machine application using the corresponding box based on sub-address information when receiving image information, said apparatus comprising:

an F-code input requesting portion which requests a user to input an F-code when the user operates said apparatus for performing transmission;

a control portion which searches for the box for which an F-code is registered, the value of which F-code agrees with the value of the F-code input by the user, and, only when finding said box, agrees to accept the transmission operation performed by the user, and registers, in document managing information for managing a transmission job relating to the transmission operation, identification information for said box as authentication information; and a transmission control portion which, when a call is coming and polling reception is requested by the call originating terminal, reads the F-code registered for the box corresponding to the authentication information registered in the document managing information corresponding to the specified document to be transmitted, and inserts information indicating said F-code in at least any one page of the image information to be transmitted.

13. A facsimile apparatus provided with boxes each corresponding to an F-code which is received through a facsimile transmission procedure, executing a center-machine application using the corresponding box based on sub-address information when receiving image information, said apparatus comprising:

an F-code input requesting portion which requests a user to input an F-code either when the user operates said apparatus for performing transmission or when the user operates said apparatus for producing a polling document;

a control portion which searches for the box for which an F-code is registered, the value of which F-code agrees with the value of the F-code input by the user, and, only when finding said box, either agrees to accept the transmission operation performed by the user, and registers, in document managing information for managing a transmission job relating to the transmission operation, identification information for said box as authentication information, or agrees to accept the polling document producing operation performed by the user, and registers, in document managing information for managing a job relating to the polling document producing operation, identification information for said box as authentication information; and a transmission control portion which, when image information is transmitted, reads the F-code registered for the box corresponding to the authentication information registered in the document managing information, and inserts information indicating said F-code in at least any one page of the image information, but, when a call is coming and polling reception is requested by the call originating terminal, reads the F-code registered for the box corresponding to the authentication information registered in the document managing information corresponding to the specified document to be transmitted, and inserts information indicating said F-code in at least any one page of the image information to be transmitted.

14. A facsimile apparatus, provided with boxes each corresponding to an F-code which is received through a facsimile transmission procedure, executing a center-machine application using the corresponding box based on sub-address information when receiving image information, said apparatus comprising:

an F-code input requesting portion which requests a user to input an F-code when the user operates said apparatus for performing transmission;

a control portion which searches for the box for which an F-code is registered, the value of which F-code agrees with the value of the F-code input by the user, and, only when finding said box, agrees to accept the transmission operation performed by the user, and registers, in document managing information for managing a transmission job relating to the transmission operation, identification information for said box as authentication information; and a transmission control portion which, when a call is coming and polling reception is requested by the call originating terminal, reads the box name registered for the box corresponding to the authentication information registered in the document managing information corresponding to the specified document to be transmitted, and inserts information indicating said box name in at least any one page of the image information to be transmitted.

15. A facsimile apparatus provided with boxes each corresponding to an F-code which is received through a facsimile transmission procedure, executing a center-machine application using the corresponding box based on sub-address information when receiving image information, said apparatus comprising:

an F-code input requesting portion which requests a user to input an F-code either when the user operates said apparatus for performing transmission or when the user operates said apparatus for producing a polling document;

a control portion which searches for the box for which an F-code is registered, the value of which F-code agrees with the value of the F-code input by the user, and, only when finding said box, either agrees to accept the transmission operation performed by the user, and registers, in document managing information for managing a transmission job relating to the transmission operation, identification information for said box as authentication information, or agrees to accept the polling document producing operation performed by the user, and registers, in document managing information for managing a job relating to the polling document producing operation, identification information for said box as authentication information; and a transmission control portion which, when image information is transmitted, reads the box name registered for the box corresponding to the authentication information registered in the document managing information, and inserts information indicating said box name in at least any one page of the image information, but, when a call is coming and polling reception is requested by the call originating terminal, reads the box name registered for the box corresponding to the authentication information registered in the document managing information corresponding to the specified document to be transmitted, and inserts information indicating said box name in at least any one page of the image information to be transmitted.

16. A facsimile apparatus, provided with boxes each corresponding to an F-code which is received through a facsimile transmission procedure, executing a center-machine application using the corresponding box based on sub-address information when receiving image information, said apparatus comprising:

an F-code input requesting portion which requests a user to input an F-code when the user operates said apparatus for performing transmission; and a control portion which searches for the box for which an F-code is registered, the value of which F-code agrees with the value of the F-code input by the user, and, only when finding said box, agrees to accept the transmission operation performed by the user, and registers, in document managing information for managing a transmission job relating to the transmission operation, identification information for said box as authentication information, wherein a box type is registered for each box, and, said control portion, when searching for the box for which the same value as that of the input F-code is registered, treats only the boxes of a previously specified box type as targets of the search.

17. The facsimile apparatus as claimed in claim 16, wherein the registered box types includes a confidential type and said previously specified box type is the confidential type.

18. The facsimile apparatus as claimed in claim 16, wherein authentication use allowance/rejection information is registered for each box, and, said control portion, when authentication use rejection is registered for the box found through the search, causes the search to fail.

19. The facsimile apparatus as claimed in claim 18, wherein the registered box types includes a confidential type and said previously specified box type is the confidential type.

20. A facsimile apparatus, provided with boxes each corresponding to an F-code which is received through a facsimile transmission procedure, executing a center-machine application using the corresponding box based on sub-address information when receiving image information, said apparatus comprising:

an F-code input requesting portion which requests a user to input an F-code when the user operates said apparatus for performing transmission;

a control portion which searches for the box for which an F-code is registered, the value of which F-code agrees with the value of the F-code input by the user, and, only when finding said box, agrees to accept the transmission operation performed by the user, and registers, in document managing information for managing a transmission job relating to the transmission operation, identification information for said box as authentication information, wherein a box type is registered for each box, and, said control portion, when searching for the box for which the same value as that of the input F-code is registered, treats only the boxes of a previously specified box type as targets of the search.

21. The facsimile apparatus as claimed in claim 20, wherein authentication use allowance/rejection information is registered for each box, and, said control portion, when authentication use rejection is registered for the box found through the search, causes the search to fail.

22. The facsimile apparatus as claimed in claim 21, wherein the registered box types includes a confidential type and said previously specified box type is the confidential type.

23. The facsimile apparatus as claimed in claim 20, wherein the registered box types includes a confidential type and said previously specified box type is the confidential type.

24. A facsimile apparatus provided with boxes each corresponding to an F-code which is received through a facsimile transmission procedure, executing a center-machine application using the corresponding box based on sub-address information when receiving image information, said apparatus comprising:

an F-code input requesting portion which requests a user to input an F-code either when the user operates said apparatus for performing transmission or when the user operates said apparatus for producing a polling document; and a control portion which searches for the box for which an F-code is registered, the value of which F-code agrees with the value of the F-code input by the user, and, only when finding said box, either agrees to accept the transmission operation performed by the user, and registers, in document managing information for managing a transmission job relating to the transmission operation, identification information for said box as authentication information, or agrees to accept the polling document producing operation performed by the user, and registers, in document managing information for managing a job relating to the polling document producing operation, identification information for said box as authentication information, wherein a box type is registered for each box, and, said control portion, when searching for the box for which the same value as that of the input F-code is registered, treats only the boxes of a previously specified box type as targets of the search.

25. The facsimile apparatus as claimed in claim 24, wherein the registered box types includes a confidential type and said previously specified box type is the confidential type.

26. The facsimile apparatus as claimed in claim 24, wherein authentication use allowance/rejection information is registered for each box, and, said control portion, when authentication use rejection is registered for the box found through the search, causes the search to fail.

27. The facsimile apparatus as claimed in claim 26, wherein the registered box types includes a confidential type and said previously specified box type is the confidential type.

28. A facsimile apparatus, provided with boxes each corresponding to an F-code which is received through a facsimile transmission procedure, executing a center-machine application using the corresponding box based on sub-address information when receiving image information, said apparatus comprising:

an F-code input requesting portion which requests a user to input an F-code when the user operates said apparatus for performing transmission; and a control portion which searches for the box for which an F-code is registered, the value of which F-code agrees with the value of the F-code input by the user, and, only when finding said box, agrees to accept the transmission operation performed by the user, and registers, in document managing information for managing a transmission job relating to the transmission operation, identification information for said box as authentication information, wherein a password for authentication is registered for each box, and, said control portion, when searching for the box for which the same value as that of the input F-code is registered, treats only the boxes for which an effective password is registered or respective effective passwords are registered as targets of the search, and wherein authentication use allowance/rejection information is registered for each box, and, said control portion, when authentication use rejection is registered for the box found through the search, causes the search to fail.

29. A facsimile apparatus, provided with boxes each corresponding to an F-code which is received through a facsimile transmission procedure, executing a center-machine application using the corresponding box based on sub-address information when receiving image information, said apparatus comprising:

an F-code input requesting portion which requests a user to input an F-code when the user operates said apparatus for performing transmission;

a control portion which searches for the box for which an F-code is registered, the value of which F-code agrees with the value of the F-code input by the user, and, only when finding said box, agrees to accept the transmission operation performed by the user, and registers, in document managing information for managing a transmission job relating to the transmission operation, identification information for said box as authentication information, wherein a password for authentication is registered for each box, and, said control portion, when searching for the box for which the same value as that of the input F-code is registered, treats only the boxes for which an effective password is registered or respective effective passwords are registered as targets of the search, and wherein authentication use allowance/rejection information is registered for each box, and, said control portion, when authentication use rejection is registered for the box found through the search, causes the search to fail.

30. A facsimile apparatus provided with boxes each corresponding to an F-code which is received through a facsimile transmission procedure, executing a center-machine application using the corresponding box based on sub-address information when receiving image information, said apparatus comprising:

an F-code input requesting portion which requests a user to input an F-code either when the user operates said apparatus for performing transmission or when the user operates said apparatus for producing a polling document; and a control portion which searches for the box for which an F-code is registered, the value of which F-code agrees with the value of the F-code input by the user, and, only when finding said box, either agrees to accept the transmission operation performed by the user, and registers, in document managing information for managing a transmission job relating to the transmission operation, identification information for said box as authentication information, or agrees to accept the polling document producing operation performed by the user, and registers, in document managing information for managing a job relating to the polling document producing operation, identification information for said box as authentication information, wherein a password for authentication is registered for each box, and, said control portion, when searching for the box for which the same value as that of the input F-code is registered, treats only the boxes for which an effective password is registered or respective effective passwords are registered as targets of the search, and wherein authentication use allowance/rejection information is registered for each box, and, said control portion, when authentication use rejection is registered for the box found through the search, causes the search to fail.

31. A facsimile apparatus, provided with boxes each corresponding to an F-code which is received through a facsimile transmission procedure, executing a center-machine application using the corresponding box based on sub-address information when receiving image information, said apparatus comprising:

an F-code input requesting portion which requests a user to input an F-code when the user operates said apparatus for performing transmission; and a control portion which searches for the box for which an F-code is registered, the value of which F-code agrees with the value of the F-code input by the user, and, only when finding said box, agrees to accept the transmission operation performed by the user, and registers, in document managing information for managing a transmission job relating to the transmission operation, identification information for said box as authentication information, wherein display of the F-code for the user to confirm the F-code input by the user is a concealment form display such that only the number of digits of the input F-code is recognized.

32. A facsimile apparatus, provided with boxes each corresponding to an F-code which is received through a facsimile transmission procedure, executing a center-machine application using the corresponding box based on sub-address information when receiving image information, said apparatus comprising:

an F-code input requesting portion which requests a user to input an F-code when the user operates said apparatus for performing transmission;

a control portion which searches for the box for which an F-code is registered, the value of which F-code agrees with the value of the F-code input by the user, and, only when finding said box, agrees to accept the transmission operation performed by the user, and registers, in document managing information for managing a transmission job relating to the transmission operation, identification information for said box as authentication information, wherein display of the F-code for the user to confirm the F-code input by the user is a concealment form display such that only the number of digits of the input F-code is recognized.

33. A facsimile apparatus provided with boxes each corresponding to an F-code which is received through a facsimile transmission procedure, executing a center-machine application using the corresponding box based on sub-address information when receiving image information, said apparatus comprising:

an F-code input requesting portion which requests a user to input an F-code either when the user operates said apparatus for performing transmission or when the user operates said apparatus for producing a polling document; and a control portion which searches for the box for which an F-code is registered, the value of which F-code agrees with the value of the F-code input by the user, and, only when finding said box, either agrees to accept the transmission operation performed by the user, and registers, in document managing information for managing a transmission job relating to the transmission operation, identification information for said box as authentication information, or agrees to accept the polling document producing operation performed by the user, and registers, in document managing information for managing a job relating to the polling document producing operation, identification information for said box as authentication information, wherein display of the F-code for the user to confirm the F-code input by the user is a concealment form display such that only the number of digits of the input F-code is recognized.

34. A method of controlling a facsimile apparatus, provided with boxes each corresponding to an F-code which is received through a facsimile transmission procedure, executing a center-machine application using the corresponding box based on sub-address information when receiving image information, said method comprising the steps of:

scanning a document and generating facsimile image information corresponding to the scanned document;

printing a received facsimile image;

requesting a user to input an F-code when the user operates said apparatus for performing transmission; and searching for the box for which an F-code is registered, the value of which F-code agrees with the value of the F-code input by the user, and, only when finding said box, agreeing to accept the transmission operation performed by the user, and registering, in document managing information for managing a transmission job relating to the facsimile image transmission operation, identification information for said box as authentication information.

35. The method as claimed in claim 34, further comprising the step of, when image information is transmitted, reading the F-code registered for the box corresponding to the authentication information registered in the document managing information, and inserting information indicating said F-code in at least any one page of the image information.

36. The method as claimed in claim 34, further comprising the step of, when image information is transmitted, reading the box name registered for the box corresponding to the authentication information registered in the document managing information, and inserting information indicating said box name in at least any one page of the image information.

37. A method of controlling a facsimile apparatus, provided with boxes each corresponding to an F-code which is received through a facsimile transmission procedure, executing a center-machine application using the corresponding box based on sub-address information when receiving image information, said method comprising the steps of:

scanning a document and generating facsimile image information corresponding to the scanned document;

printing a received facsimile image;

requesting a user to input an F-code when the user operates said apparatus for producing a polling document; and searching for the box for which an F-code is registered, the value of which F-code agrees with the value of the F-code input by the user, and, only when finding said box, agreeing to accept the facsimile polling document producing operation performed by the user, and registering, in document managing information for managing a job relating to the polling document producing operation, identification information for said box as authentication information.

38. A method of controlling facsimile apparatus, provided with boxes each corresponding to an F-code which is received through a facsimile transmission procedure, executing a center-machine application using the corresponding box based on sub-address information when receiving image information, said method comprising the steps of:

scanning a document and generating facsimile image information corresponding to the scanned document;

printing a received facsimile image;

requesting a user to input an F-code either when the user operates said apparatus for performing transmission or when the user operates said apparatus for producing a polling document; and searching for the box for which an F-code is registered, the value of which F-code agrees with the value of the F-code input by the user, and, only when finding said box, either agreeing to accept the transmission operation performed by the user, and registering, in document managing information for managing a transmission job relating to the facsimile image transmission operation, identification information for said box as authentication information, or agreeing to accept the polling document producing operation performed by the user, and registering, in document managing information for managing a job relating to the polling document producing operation, identification information for said box as authentication information.

39. A method of controlling a facsimile apparatus, provided with boxes each corresponding to an F-code which is received through a facsimile transmission procedure, executing a center-machine application using the corresponding box based on sub-address information when receiving image information, said method comprising the steps of:

a) requesting a user to input an F-code when the user operates said apparatus for producing a polling document;

b) searching for the box for which an F-code is registered, the value of which F-code agrees with the value of the F-code input by the user, and, only when finding said box, agreeing to accept the polling document producing operation performed by the user, and registering, in document managing information for managing a job relating to the polling document producing operation, identification information for said box as authentication information; and c) when a call is coming and polling reception is requested by the call originating terminal, reading the F-code registered for the box corresponding to the authentication information registered in the document managing information corresponding to the specified document to be transmitted, and inserting information indicating said F-code in at least any one page of the image information to be transmitted.

40. A method of controlling facsimile apparatus, provided with boxes each corresponding to an F-code which is received through a facsimile transmission procedure, executing a center-machine application using the corresponding box based on sub-address information when receiving image information, said method comprising the steps of:
  a) requesting a user to input an F-code either when the user operates said apparatus for performing transmission or when the user operates said apparatus for producing a polling document;
  b) searching for the box for which an F-code is registered, the value of which F-code agrees with the value of the F-code input by the user, and, only when finding said box, either agreeing to accept the transmission operation performed by the user, and registering, in document managing information for managing a transmission job relating to the transmission operation, identification information for said box as authentication information, or agreeing to accept the polling document producing operation performed by the user, and registering, in document managing information for managing a job relating to the polling document producing operation, identification information for said box as authentication information; and
  c) when image information is transmitted, reading the F-code registered for the box corresponding to the authentication information registered in the document managing information, and inserting information indicating said F-code in at least any one page of the image information, but, when a call is coming and polling reception is requested by the call originating terminal, reading the F-code registered for the box corresponding to the authentication information registered in the document managing information corresponding to the specified document to be transmitted, and inserting information indicating said F-code in at least any one page of the image information to be transmitted.

41. A method of controlling a facsimile apparatus, provided with boxes each corresponding to an F-code which is received through a facsimile transmission procedure, executing a center-machine application using the corresponding box based on sub-address information when receiving image information, said method comprising the steps of:
  a) requesting a user to input an F-code when the user operates said apparatus for producing a polling document;
  b) searching for the box for which an F-code is registered, the value of which F-code agrees with the value of the F-code input by the user, and, only when finding said box, agreeing to accept the polling document producing operation performed by the user, and registering, in document managing information for managing a job relating to the polling document producing operation, identification information for said box as authentication information; and
  c) when a call is coming and polling reception is requested by the call originating terminal, reading the box name registered for the box corresponding to the authentication information registered in the document managing information corresponding to the specified document to be transmitted, and inserting information indicating said box name in at least any one page of the image information to be transmitted.

42. A method of controlling facsimile apparatus, provided with boxes each corresponding to an F-code which is received through a facsimile transmission procedure, executing a center-machine application using the corresponding box based on sub-address information when receiving image information, said method comprising the steps of:
  a) requesting a user to input an F-code either when the user operates said apparatus for performing transmission or when the user operates said apparatus for producing a polling document;
  b) searching for the box for which an F-code is registered, the value of which F-code agrees with the value of the F-code input by the user, and, only when finding said box, either agreeing to accept the transmission operation performed by the user, and registering, in document managing information for managing a transmission job relating to the transmission operation, identification information for said box as authentication information, or agreeing to accept the polling document producing operation performed by the user, and registering, in document managing information for managing a job relating to the polling document producing operation, identification information for said box as authentication information; and
  c) when image information is transmitted, reading the box name registered for the box corresponding to the authentication information registered in the document managing information, and inserts information indicating said box name in at least any one page of the image information, but, when a call is coming and polling reception is requested by the call originating terminal, reading the box name registered for the box corresponding to the authentication information registered in the document managing information corresponding to the specified document to be transmitted, and inserting information indicating said box name in at least any one page of the image information to be transmitted.

43. A facsimile apparatus having a plurality of confidential boxes, each confidential box characterized by a different F-code and different identification information, the apparatus comprising:
  an input part that requests a prospective user to input an F-code when the prospective user seeks to use the apparatus to transmit confidential information; and
  a control part that
  searches among the plurality of confidential boxes for a confidential box whose characteristic F-code matches the F-code input by the prospective user and, if a confidential box characterized by the matching F-code is found,
  enables the prospective user to transmit the confidential information only if the prospective user is authenticated by means of the characteristic identification information of the confidential box characterized by the matching F-code.

44. The facsimile apparatus as claimed in claim 43, further comprising a transmission part that inserts the matching F-code into the confidential information when the confidential information is transmitted.

45. A facsimile apparatus having a plurality of confidential boxes, each box characterized by a different F-code and different identification information, the apparatus comprising:
- an input part that requests a prospective user to input an F-code when the prospective user seeks to use the apparatus to produce a polling document; and
- a control part that searches among the plurality of confidential boxes for a confidential box whose characteristic F-code matches the F-code input by the prospective user and, if a confidential box characterized by the matching F-code is found, enables the prospective user to produce the polling document only if the prospective user is authenticated by means of the characteristic identification information of the confidential box characterized by the matching F-code.

46. The facsimile apparatus as claimed in claim 45, further comprising a transmission part that inserts the matching F-code into the polling document when the polling document is produced.

47. A facsimile apparatus having a plurality of confidential boxes, each box characterized by a different F-code and different identification information, the apparatus comprising:
- an input part that requests a prospective user to input an F-code when the prospective user seeks to use the apparatus either to transmit confidential information or to produce a polling document; and
- a control part that searches among the plurality of confidential boxes for a confidential box whose characteristic F-code matches the F-code input by the prospective user and, if a confidential box characterized by the matching F-code is found, enables the prospective user either to transmit the confidential information or to produce the polling document only if the prospective user is authenticated by means of the characteristic identification information of the confidential box characterized by the matching F-code.

48. The facsimile apparatus as claimed in claim 47, further comprising a transmission part that inserts the matching F-code into the confidential information when the confidential information is transmitted or inserts the matching F-code into the polling document when the polling document is produced.

49. A method of controlling a facsimile apparatus having a plurality of confidential boxes, each box characterized by a different F-code and different identification information, the method comprising the steps of:
- requesting a prospective user to input an F-code when the prospective user seeks to use the apparatus to transmit confidential information;
- searching among the plurality of confidential boxes for a confidential box whose characteristic F-code matches the F-code input by the prospective user; and, if a confidential box characterized by the matching F-code is found,
- enabling the prospective user to transmit the confidential information only if the prospective user is authenticated by means of the characteristic identification information of the confidential box characterized by the matching F-code.

50. A method of controlling a facsimile apparatus having a plurality of confidential boxes, each confidential box characterized by a different F-code and different identification information, the method comprising the steps of:
- requesting a prospective user to input an F-code when the prospective user seeks to use the apparatus to produce a polling document;
- searching among the plurality of confidential boxes for a confidential box whose characteristic F-code matches the F-code input by the prospective user; and, if a confidential box characterized by the matching F-code is found,
- enabling the prospective user to produce the polling document only if the prospective user is authenticated by means of the characteristic identification information of the confidential box characterized by the matching F-code.

* * * * *